（12） United States Patent
Ishibashi et al.

(10) Patent No.: US 7,158,452 B2
(45) Date of Patent: Jan. 2, 2007

(54) FOCUS CONTROL FOR OPTICAL DISK UNIT

(75) Inventors: Hiromichi Ishibashi, Osaka (JP); Katsuya Watanabe, Nara (JP); Kenji Fujiune, Osaka (JP); Shinichi Yamada, Osaka (JP); Yuuichi Kuze, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 401 days.

(21) Appl. No.: 10/468,270

(22) PCT Filed: Feb. 20, 2002

(86) PCT No.: PCT/JP02/01513

§ 371 (c)(1),
(2), (4) Date: Aug. 18, 2003

(87) PCT Pub. No.: WO02/067250

PCT Pub. Date: Aug. 29, 2002

(65) Prior Publication Data

US 2004/0076090 A1    Apr. 22, 2004

(30) Foreign Application Priority Data

Feb. 22, 2001    (JP)    .............................. 2001-046057
Apr. 26, 2001    (JP)    .............................. 2001-128872

(51) Int. Cl.
    *G11B 7/095*    (2006.01)
(52) U.S. Cl. .................................................. 369/44.29
(58) Field of Classification Search ..................... None
    See application file for complete search history.

(56) References Cited

U.S. PATENT DOCUMENTS 6,683,845 B1 *    1/2004    Kishima et al. ......... 369/275.2
6,721,244 B1 *    4/2004    Kubota .................... 369/44.27

FOREIGN PATENT DOCUMENTS

| JP | 61-048134 | 3/1986 |
|----|-----------|--------|
| JP | 63-155425 | 6/1988 |
| JP | 01-176330 | 7/1989 |
| JP | 01-204229 | 8/1989 |
| JP | 01-260633 | 10/1989 |
| JP | 5-089589 | 4/1993 |
| JP | 5-120698 | 5/1993 |
| JP | 06-103584 | 4/1994 |
| JP | 06-290467 | 10/1994 |
| JP | 07-078353 | 3/1995 |
| JP | 08-185635 | 7/1996 |
| JP | 11-339276 | 12/1999 |

* cited by examiner

*Primary Examiner*—William Korzuch
*Assistant Examiner*—Joseph Haley
(74) *Attorney, Agent, or Firm*—Renner, Otto, Boisselle & Sklar, LLP

(57) ABSTRACT

An optical disc unit 2001 comprises: reflective surface detection means 1010 for detecting a reflective surface; focus control means (1202, 1003, 1009, 1008, 1003, 1012, 1005 and 1204) for performing focus control to a reflective surface so that the distance between the focal point of an optical beam applied to an optical disc 2100 and the reflective surface is within a predetermined error limit; shift means 1007 for shifting the focal point of the optical beam in a direction perpendicular to the optical disc; and control means 1006 for controlling the focus control means and the shift means.

23 Claims, 29 Drawing Sheets

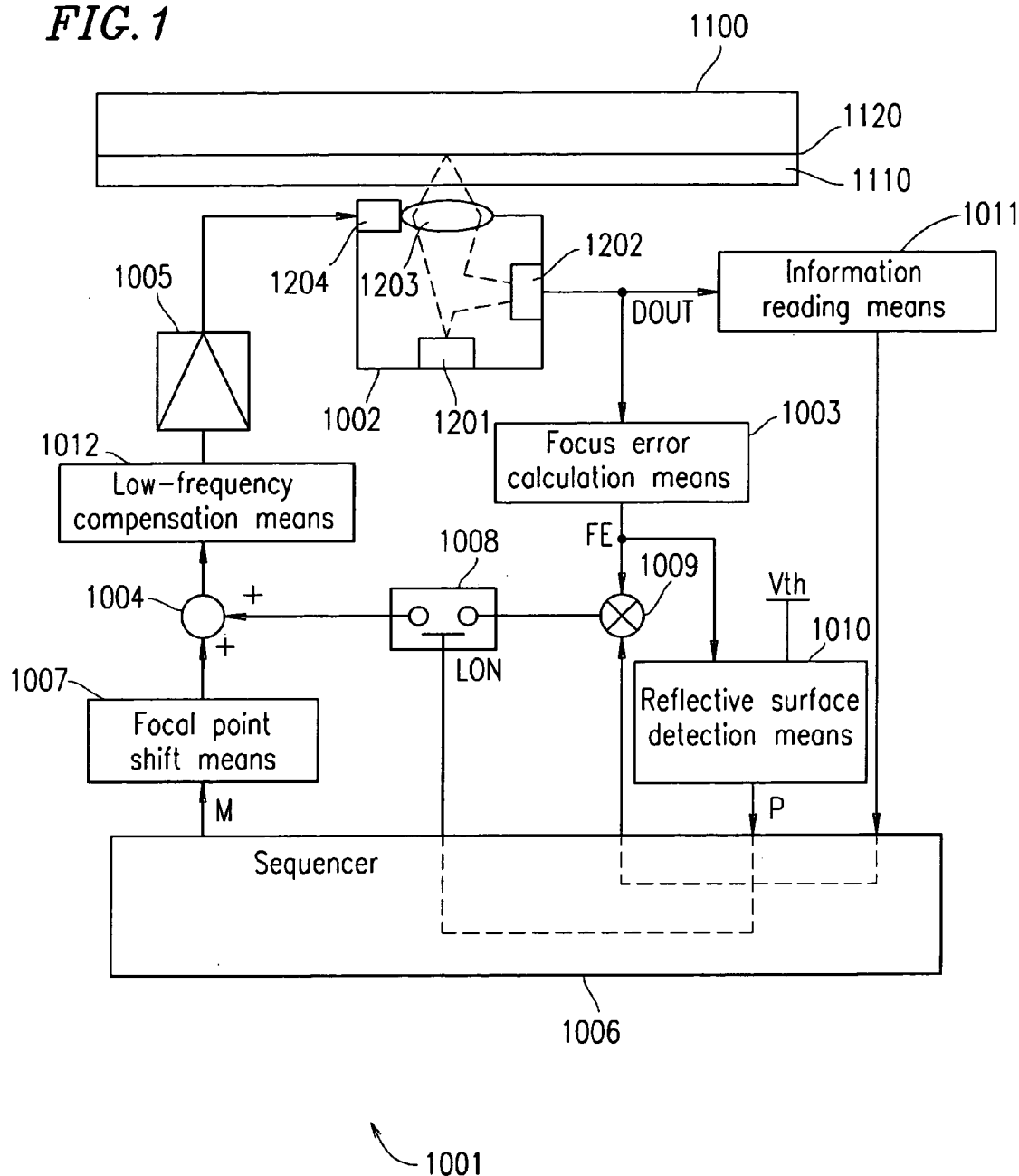

FIG.27   Outer light-receiving section

Spherical aberration

Objective lens 2103

Outer focal point

Inner focal point

First information surface

Second information surface

Inner focal point

Outer focal point

Outer focal point

Inner focal point 0 level

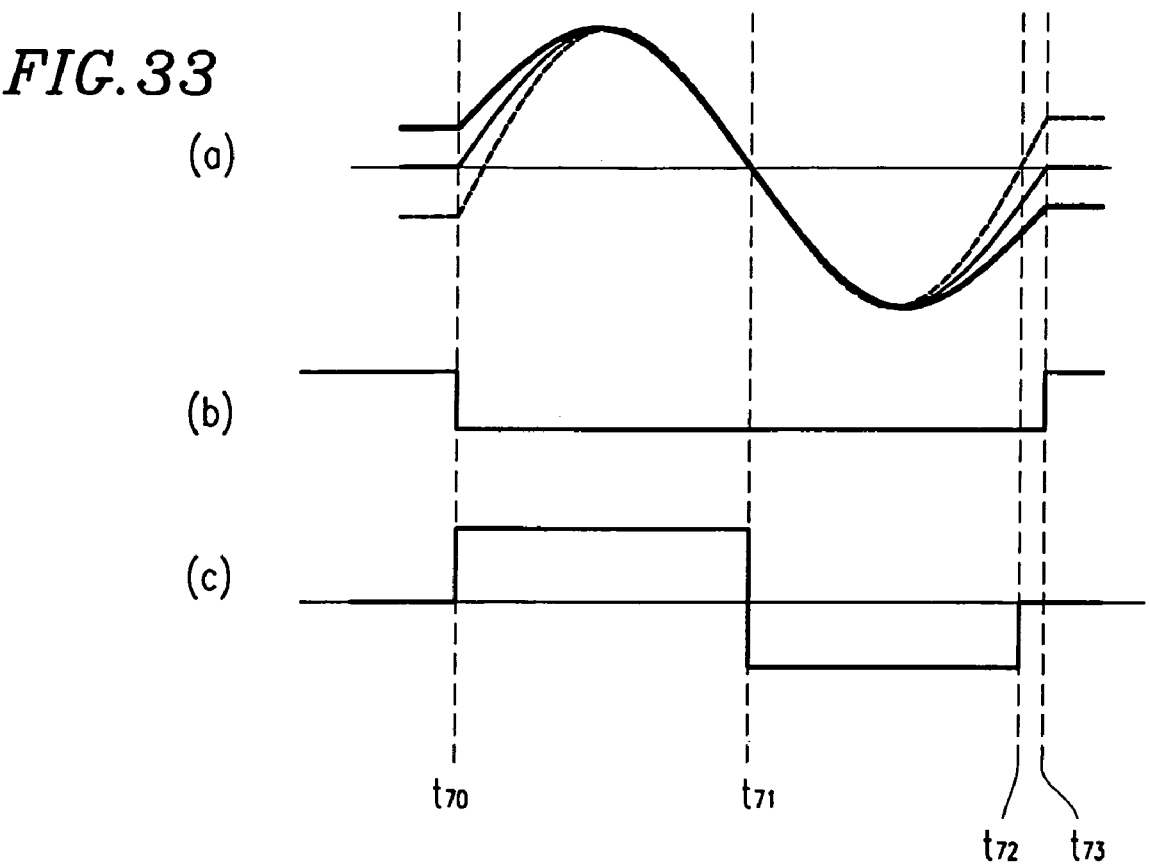

FOCUS CONTROL FOR OPTICAL DISK UNIT

TECHNICAL FIELD

The present invention relates to an optical disc unit for recording information such as digital video information on an optical disc in high density and reproducing information recorded on an optical disc, and in particular, an optical disc unit which is capable of performing an accurate focus control to an information surface of an optical disc.

BACKGROUND ART

Recently, optical discs have been drawing attention as exchangeable media with a high capacity and an optical disc unit is expected to be used more widely as a video recorder in the future. One of the reasons why the optical disc is a high-capacity exchangeable medium is that it allows performance of recording/reproduction without contacting the medium. In other words, a laser beam is focused and an information recording layer of an optical disc is irradiated with the focal point thereof, and thus recording and reproduction are performed. Therefore, even when some dirt or dust is adhered on the surface of the disc, a head crash does not occur as it does, for example, in magnetic recording.

However, such a characteristic of the optical disc is based on a major premise: a focus control, i.e., a control for maintaining the distance between the focal point of a convergence laser beam and the information recording layer within an allowable error limit is stably performed. Once the focus is out of control, an objective lens actuator of an optical head runs out of control and may crash into the optical disc surface. Such an off-focus frequently occurs particularly when focusing is performed, i.e., during the process of shifting a laser beam focal point into a capture range of the focus control and then closing a focus control loop, immediately after an optical disc drive is activated. Thus, conventionally, various methods of focusing have been studied.

For example, in a method described in Japanese Laid-Open Publication No. 9-115147, whether an initial laser beam focal point is close or far relative to the optical disc information recording layer is determined beforehand and the focusing process is performed in accordance with this initial state. When the focal point is determined to be close relative to the information recording layer, the objective lens actuator is driven to bring the focal point closer to the information recording layer and when the focal point enters the capture range of the focusing, the operation is switched to a close loop operation of the focus control. Alternately, when it is determined to be far, the actuator is driven to be further, and then the operation is similarly switched to the close loop operation.

However, the conventional method has the problem of an increased rate of collision between an objective lens and the optical disc surface in the case where a working distance of the objective lens (the distance between the objective lens and the optical disc surface) is smaller than the wobbling of the optical disc. Specifically, there is no problem when the focusing is achieved with one attempt. However, if it fails, even though the objective lens actuator does not run out of control, in the case where the wobbling of the disc is greater than the working distance, there is a possibility that the disc collides into the objective lens.

For the currently available CD players and DVD players, the NA (numerical aperture) of the objective lens is about 0.45 to 0.6 at most. Thus, it is possible to ensure a working distance of 0.5 mm or more. Therefore, wobbling of about 0.2 mm, which may usually occur, can be sufficiently absorbed. However, if the NA is raised to its limit in order to further increase the recording capacity in the future, the designed working distance of the objective lens becomes extremely small. For example, if the NA is 0.85, even if the thickness of a protective layer is lowered to about 0.1 mm (the thickness of a protective layer is 1.2 mm in a CD and 0.6 mm in a DVD), the working distance is about 0.15 mm.

The present invention was conceived in view of such problems. The objective of the present invention is to provide an optical disc unit for performing a focus control which is capable of significantly reducing the frequency of collisions of an objective lens into an optical disc surface even when a sufficient working distance of the objective lens is not ensured due to an increased capacity of the optical disc.

As a conventional optical disc unit, there is an optical disc unit in which an optical beam generated from a light source such as a semiconductor laser is focused on and applied to an optical disc rotating with a predetermined rotation number and signals recorded on the optical disc are reproduced. The optical disc includes a plurality of tracks formed in spiral forms. The tracks are formed of grooves having concave and convex portions. A recording film of a phase-shift material or the like is attached to an information surface. For recording information on the optical disc, the strength of the optical beam is changed in accordance with the information, with a focus control performed such that a focal point of the optical beam is on the information surface, and with a tracking control performed such that the focal point is on the tracks. Thus, the reflectance of the recording film is varied. For reproducing information on the optical disc, light reflected off the optical disc is received at a photodetector, similarly, with the focus control performed such that a focal point of the optical beam is on the information surface and with the tracking control performed such that the focal point is on the tracks. The output of the photodetector is processed to reproduce the information.

A focus error signal indicating misalignment between an information surface of an optical disc and a focal point of an optical beam is detected by astigmatic method or the like. The focus error signal becomes zero when the focal point is on the information surface. In general, the detection limit of the astigmatic method is about 10 μm. Thus, for operating a focus control system, the objective lens is moved beforehand so as to shift the position of the focal point into the detection limit. The focus control is performed at the time when the focus error signal crosses zero. However, when the focal point passes the optical disc surface, the focus error signal also crosses zero. If the focus control is performed when zero-crossing occurs at the optical disc surface, the focal control is performed such that the focal point is positioned on the optical disc surface. In order to prevent this, the fact that the reflectance of the information surface is higher than that of the optical disc surface is utilized. More specifically, zero-crossing which occurs at the recording surface is detected when the level of the total internal reflection amount is detected to exceed a predetermined level.

Recently, a rewritable optical disc which has two information surfaces on one side of the optical disc has been proposed. Hereinafter, such an optical disc is referred to as a doublelayer optical disc. In the doublelayer optical disc, when information on the information surface further from the objective lens is reproduced, it is reproduced with an optical beam which has been transmitted through the information surface closer to the objective lens. Thus, the double-layer optical disc is designed such that the reflectance of the information surface closer to the objective lens is low.

Accordingly, the amount of light from each of the information surfaces which is received at a photodetector becomes small. The optical disc having one information surface is referred to as a single-layer optical disc.

As described above, the level of the total internal reflection amount at each of the information surfaces becomes low in the doublelayer optical disc. Thus, it is difficult to distinguish the optical disc surface and the information surfaces based on the total internal reflection amount. This means that it is difficult to ensure the focusing to the information surface if the focusing is performed in a method similar to the conventional method.

The present invention is conceived in view of the above-described problem. The objective of the present invention is to provide an optical disc unit which is capable to ensure the focusing to the information surface even in the case where difference between the amount of the total internal reflection off the optical disc surface and the amount of the total internal reflection off the information surface is small (for example, in the case where a doublelayer optical disc is used).

DISCLOSURE OF THE INVENTION

The present invention provides an optical disc unit for an optical disc having one or more information recording layers and one or more protective layers formed on the information recording layers, comprising: reflective surface detection means for detecting a reflective surface; focus control means for performing focus control to the reflective surface such that a distance between a focal point of an optical beam applied to the optical disc and the reflective surface is within a predetermined error limit; shift means for shifting the position of the focal point in a direction perpendicular to the optical disc; and control means for controlling the focus control means and the shift means, wherein the control means controls the shift means such that the focal point of the optical beam shifts toward the protective layer until a surface of the protective layer is detected by the reflective surface detection means, the control means controls the focus control means to perform focus control to the surface of the protective layer when the surface of the protective layer is detected, the control means controls the shift means to release the focus control to the surface of the protective layer and shifts the focal point of the optical beam toward the information recording layer until a surface of the information recording layer is detected by the reflective surface detection means, and the control means controls the focus control means to perform focus control to the surface of the information recording layer when the surface of the information recording layer is detected, thereby achieving the above-described objectives.

A feedback gain of the focus control to the surface of the protective layer and a feedback gain of the focus control to the surface of the information recording layer may be set such that the product of the feedback gain of the focus control to the surface of the protective layer and a reflectance of the surface of the protective layer is equal to the product of the feedback gain of the focus control to the surface of the information recording layer and a reflectance of the surface of the information recording layer.

Information indicating the reflectance of the information recording layer may be formed beforehand on the surface of the protective layer, the control means may read the information from the surface of the protective layer while the focus control to the surface of the protective layer is performed, and may set the feed back gain of the focus control to the surface of the information recording layer based on the information.

The reflectance of the surface of the protective layer may be 3% to 5%.

The present invention provides an optical disc unit for an optical disc having one or more information surfaces having a plurality of tracks formed thereon, comprising: tracking error detection means for detecting a misalignment between an optical beam applied to the optical disc and one of the plurality of the tracks corresponding thereto, and outputting a tracking error signal indicating the misalignment; amplification detection means for detecting amplification of the tracking error signal; focus control means for performing focus control such that a distance between a focal point of the optical beam and the information surface is within a predetermined error limit; shift means for shifting the position of the focal point of the optical beam toward the optical disc; and control means for controlling the focus control means and the shift control means, wherein the control means controls the shift means such that the focal point of the optical beam is shifted in a direction traversing tracks formed on the information surface of the optical disc and approaches the optical disc with an operation of the focus control means stopped; and the control means allows the focus control means to start the operation only when the amplification of the tracking error signal is detected to become a predetermined value or higher by the amplification detection means, thereby achieving the above-described objectives.

Each of the plurality of the tracks formed on the information surface may be wavy.

An optical disc unit may further comprises zero-cross detection means for detecting that a focus error signal indicating a misalignment between the focal point of the optical beam and the information surface crosses zero, and the control means may start an operation of the focus control means when the amplification of the tracking error signal is detected to become the predetermined value or higher by the amplification detection means and the focus error signal is detected to cross zero by the zero-cross detection means.

An optical disc unit may further comprise a band-pass filter, and the tracking error signal may be supplied to the amplification detection means via the band-pass filter.

The control means may control rotations of the optical disc such that the number of rotations of the optical disc when the amplification of the tracking error signal is detected by the amplification detection means is smaller than the number of rotations of the optical disc when information recorded on the information surface of the optical disc is being reproduced.

The control means may control strength of the optical beam such that strength of the optical beam when the amplification of the tracking error signal is detected by the amplification detection means is smaller than strength of the optical beam when information recorded on the information surf ace of the optical disc is being reproduced.

The control means may perform the focus control with rotations of the optical disc stopped and controls the rotations of the optical disc such that the optical disc starts to rotate after the distance between the focal point of the optical beam and the information surface is detected to be within the predetermined error limit.

The present invention provides an optical disc unit for an optical disc having one or more information surfaces, comprising: focus error detection means for outputting a focus error signal indicating a misalignment between a focal point of an optical beam applied to the optical disc and a predetermined surface; shift means for shifting the position of the focal point of the optical beam in a direction perpendicular to the optical disc; focus control means for performing focus control to the predetermined surface such that a distance between the focal point of the optical beam and the predetermined surface is within a predetermined error limit by controlling the shift means based on the focus error signal; zero-cross detection means for detecting that the focus error signal crosses zero; and control means for controlling the focus control means and the shift means, wherein the control means controls the shift means such that the focal point of the optical beam shifts in a first direction toward a surface of the optical disc until the focus error signal is detected to cross zero for the first time by the zero-cross detection means, the control means controls the shift means such that, when the focus error signal is detected to cross zero for the first time, the focal point of the optical beam further shifts in the first direction by a predetermined distance which is larger than a distance between the surface of the optical disc and the information surface, the control means controls the shift means such that, until the focal point of the optical beam has been further shifted in the first direction by the predetermined distance and when the focus error signal is detected to cross zero for the second time by the zero-cross detection means, the focal point of the optical beam is shifted toward the information surface in a second direction opposite to the first direction, and the control means controls the focus control means to perform the focus control to the information surface when the focus error signal is detected to cross zero for the second time, thereby achieving above-described objectives.

The control means may perform the focus control with rotations of the optical disc stopped and controls the rotations of the optical disc such that the optical disc starts to rotate after the distance between the focal point of the optical beam and the information surface is detected to be within the predetermined error limit.

The present invention provides an optical disc unit for an optical disc having one or more information surfaces, comprising: focus error detection means for outputting a focus error signal indicating a misalignment between a focal point of an optical beam applied to the optical disc and a predetermined surface; shift means for shifting the position of the focal point of the optical beam in a direction perpendicular to the optical disc; focus control means for performing focus control to the predetermined surface such that the distance between the focal point of the optical beam and the predetermined surface is within a predetermined error limit by controlling the shift means based on the focus error signal; zero-cross detection means for detecting that the focus error signal crosses zero; and control means for controlling the focus control means and the shift means, wherein the control means controls the shift means such that the focal point of the optical beam shifts toward the surface of the optical disc until the focus error signal is detected to cross zero for the first time by the zero-cross detection means, the control means controls the focus control means to perform focus control to the surface of the optical disc when the focus error signal is detected to cross zero for the first time, the control means stores displacement information indicating displacement of the shift means in accordance with a rotation angle of the optical disc in storage means while the focus control to the surface of the optical disc is performed, the control means controls the shift means such that the focal point of the optical beam shifts toward the information surface based on the displacement information stored in the storage means with an operation of the focus control means stopped until the focus error signal is detected to cross zero for the second time by the zero-cross detection means, and the control means controls the focus control means to perform the focus control to the information surface when the focus error signal is detected to cross zero for the second time, thereby achieving above-described objectives.

The focus control means may control phase compensation such that a band in which a phase leads is wider, compared to when information recorded on the optical disc is being reproduced, for a predetermined period after the focus control means has started the operation.

The focus control means may set a gain such that the gain is smaller, compared to when information recorded on the optical disc is being reproduced, for a predetermined period after the focus control means has started the operation.

The present invention provides an optical disc unit for an optical disc having a plurality of information surfaces, comprising: photodetection means for detecting light reflected off the optical disc when an optical beam is applied to a predetermined surface among the plurality of information surfaces; focus error detection means for outputting a focus error signal indicating a misalignment between a focal point of the optical beam and the predetermined information surface based on an output from the photodetection means; total internal reflection amount detection means for detecting an amount of total internal reflection off the optical disc based on the output from the photodetection means; and normalization means for generating a normalized focus error signal by dividing the focus error signal by a value obtained by subtracting a signal value corresponding to a reflection amount reflected off information surfaces other than the predetermined information surface of the optical disc from the output of the total internal reflection amount detection means, thereby achieving the above-described objectives.

An optical disc unit may further comprises: shift means for shifting the position of the focal point of the optical beam in a direction perpendicular to the optical disc; focus control means for performing focus control such that a distance between the focal point of the optical beam and the predetermined information surface is within a predetermined error limit by controlling the shift means based on the normalized focus error signal; and focus gain measurement means for measuring a gain of a system of the focus control, and the signal value may vary depending on an output from the focus gain measurement means.

An optical disc unit may further comprises shift means for shifting the position of the focal point of the optical beam in a direction perpendicular to the optical disc, and the signal value may vary such that amplification of the normalized focus error signal is a constant value when the shift means is driven such that the focal point of the optical beam passes through the predetermined information surface of the optical disc.

The signal value may vary depending on each of the plurality of the information surfaces.

An optical disc unit may further comprises stray light detection means for detecting light reflected off information surfaces other than the predetermined information surface of the optical disc on which the focal point of the optical beam is located, and the signal value may vary based on an output from the stray light detection means.

An optical disc unit may further comprises: shift means for shifting the position of the focal point of the optical beam in a direction perpendicular to the optical disc; and control means for controlling the shift means based on the normalized focus error signal so as to control the shift means to shift the focal point of the optical beam to information surfaces other than the predetermined information surface of the optical disc.

The photodetection means may further include optical beam splitting means for splitting light reflected off the optical disc into light of an inner region near an optical axis and light of an outer region far from the optical axis; the focus error detection means may include inner focus error detection means for detecting a misalignment between the focal point of the optical beam and the predetermined information surface of the optical disc based on the light of the inner region, and outer focus error detection means for detecting the misalignment between the focal point of the optical beam and the predetermined information surface of the optical disc based on the light of the outer region; and the control means may control the shift means based on at least one of an output from the inner focus error detection means and an output from the outer focus error detection means so as to control the shift means to shift the focal point of the optical means to information surfaces other than the predetermined information surface of the optical disc.

BRIEF DESCRIPTION OF THE DRAWINGS

FIG. 1 is a block diagram showing an exemplary structure of an optical disc unit according to Embodiment 1 of the present invention;

FIG. 33 shows waveforms of the signals used in the optical disc unit.

BEST MODE FOR CARRYING OUT THE INVENTION

Figure 2A:
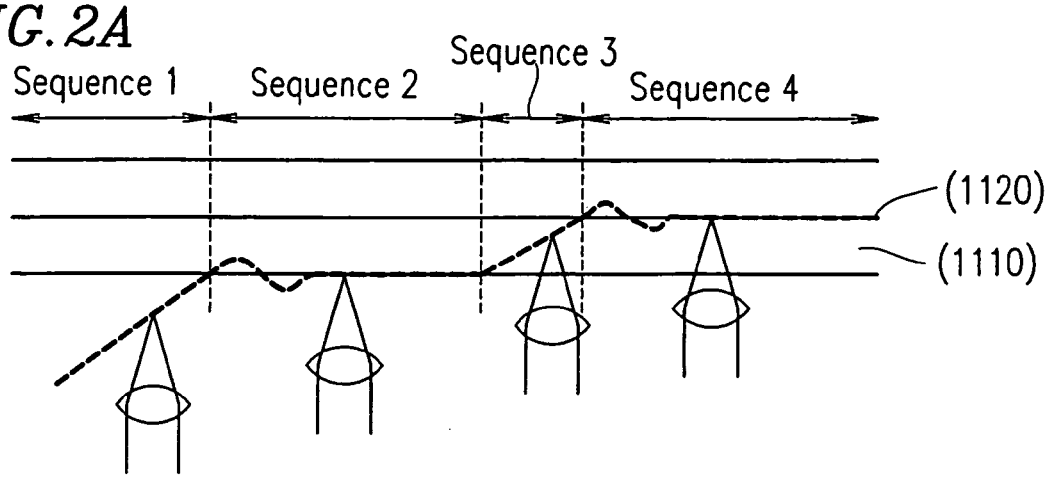
FIG. 2A shows a change in the position of a focal point of a convergence laser beam over sequences 1 through 4.

Hereinafter, embodiments of the present invention will be described with reference to the drawings.

(Embodiment 1)

FIG. 1 shows an exemplary structure of an optical disc unit 1001 according to Embodiment 1 of the present invention.

The optical disc unit 1001 records information on an optical disc 1100 and reproduces information recorded on the optical disc 1100. The optical disc 1100 has an information recording layer 1120 and a protective layer 1110 formed on the information recording layer 1120.

The optical disc unit 1001 includes an optical head 1002 for irradiating the information recording layer 1120 with a convergence laser beam.

The optical head 1002 includes a laser light source 1201, light receiving means 1202, an objective lens actuator 1204, and an objective lens 1203.

The laser light source 1201 outputs a laser beam. The laser beam output from the laser light source 1201 is focused with the objective lens 1203. As a result, the optical disc 1100 is irradiated with the convergence laser beam. The convergence laser beam reflected off the optical disc 1100 passes through the objective lens 1203 and is received by the light receiving means 1202. The objective lens 1203 is driven by the objective actuator 1204.

The light receiving means 1202 is formed of, for example, light receiving sections divided into plural parts. A group of signals output from the light receiving means 1202 (DOUT) are supplied to focus error calculation means 1003 and information reading means 1011. The focus error calculation means 1003 generates a focus error signal (FE) from the signal group DOUT. The focus error signal varies in accordance with the distance between the focal point of the convergence laser beam and a reflective surface (a surface of the protective layer 1110 or the information recording layer 1120, which will be described in detail later). The focus error signal FE feeds back to the objective lens actuator 1204 of the optical head 1002 via a gain amplifier 1009, a switch 1008, adding means 1004, low-frequency compensation means 1012, and an actuator driver 1005.

Thus, a focus control loop for performing focus servo by the light receiving means 1202, the focus error calculation means 1003, the gain amplifier 1009, the switch 1008, the adding means 1004, the low-frequency compensation means 1012, the actuator driver 1005, and the objective lens actuator 1204 is formed. The switch 1008 is used for opening and closing the focus control loop. The adding means 1004 is used for adding the output signal of focal point shift means 1007, which will be described later, to the focus control loop.

The light receiving means 1202, the focus error calculation means 1003, the gain amplifier 1009, the switch 1008, the adding means 1004, the low-frequency compensation means 1012, the actuator driver 1005, and the objective lens actuator 1204 act as focus control means for performing the focus control to the reflective surface such that the distance between the focal point of the convergence laser beam and the reflective surface is within a predetermined error limit by driving the objective lens actuator 1204 based on the focus error signal FE.

The focal point shift means 1007 forcibly shifts the focal point of the convergence laser beam vertically with respect to the optical disc surface. The output signal of the focal point shift means 1007 is added to the focus control loop by the adder 1004.

A sequencer 1006 controls the focal point shift means 1007 and the focus control means. The sequencer 1006 controls the focus control means by switching the switch 1008 between on and off. When the switch 1008 is on, the focus control loop is closed, and thus the focus control means operates. When the switch 1008 is off, the focus control loop is open, and thus the operation of the focus control means stops.

The sequencer 1006 may be formed of, for example, microprocessors with programs for generating sequences 1 through 4 which will be described later incorporated therein.

Figure 2B:
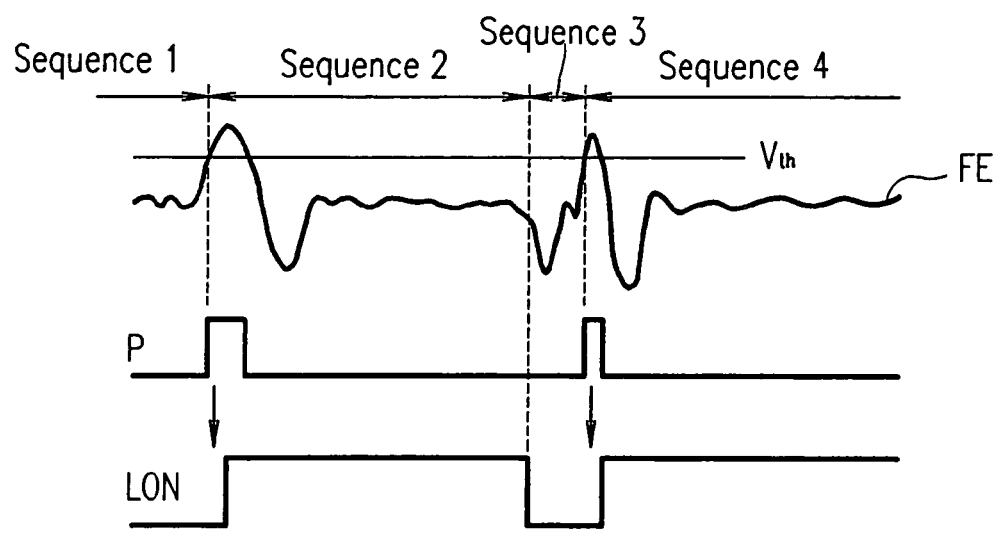
FIG. 2B shows a change in a focus error signal FE over the sequences 1 through 4.

Hereinafter, with reference to FIGS. 2A and 2B, a function of the sequencer 1006 will be explained. The sequencer 1006 sequentially performs the following sequences 1 through 4. FIG. 2A shows the change in the position of the focal point of the convergence laser beam over the sequences 1 through 4. FIG. 2B shows the change in the focus error signal FE over the sequences 1 through 4.

(Sequence 1)

The sequencer 1006 controls the focal point shift means 1007 such that the focal point of the convergence laser beam shifts toward the protective layer 1110. Such a control is performed by, for example, the sequencer 1006 issuing command M to the focal point shift means 1007. In response to the command M, a DC current is supplied to the objective lens actuator 1204. Therefore, the objective lens 1203 moves at a predetermined speed in a direction perpendicular to the optical disc 1100.

In sequence 1, the switch 1008 is turned off. Thus, the focus control loop is open and the focus control means is stopped.

Sequence 1 ends when a reflective surface (i.e., a surface of the protective layer 1110) is detected by reflective surface detection means 1010.

The reflective surface can be detected by, for example, detecting that the focus error signal FE exceeds a predetermined threshold value ($V_{th}$) (FIG. 2B). Such a detection can be performed by utilizing a specific characteristic of the focus error signal that, when the distance between the focal point of the convergence laser beam and the reflective surface is short (i.e., within a detectable range), a focus error signal having an amplitude approximately proportional to a focus error can be obtained, but when the distance is out of the detectable range, a signal having such amplitude cannot be obtained (the so-called s-shape characteristic).

(Sequence 2)

The sequencer 1006 controls the focus control means so as to perform the focus control to the surface of the protective layer 1110. This is performed by switching the switch 1008 from off to on. The reflective surface detection means 1010 outputs an output pulse signal P when reflective surface detection means 1010 detects that the focus error signal FE exceeds the predetermined threshold value ($V_{th}$). In response to an edge of the output pulse signal P, the sequencer 1006 generates a loop-on-signal (LON) for closing the switch 1008. Thus, the switch is turned on, and the focus control to the surface of the protective layer 1110 is started.

Sequence 2 ends when the focus control to the surface of the protective layer 1110 is stabilized. For example, after a predetermined time period has passed from the beginning of the focus control, there is no problem to regard that the focus control is stabilized. The predetermined time period is preferably about ten times (or more) of a response time period determined depending on the focus control band. For example, if the response time corresponding to the focus control band of 10 kHz is 0.1 ms, the predetermined time period is preferably 1 ms(=0.1 ms×10) or more.

(Sequence 3)

The sequencer 1006 releases the focus control to the surface of the protective layer 1110. This is performed by switching the switch 1008 from on to off.

Then, the sequencer 1006 controls the focal shift means 1007 such that the focal point of the convergence laser beam shifts toward the information recording layer 1120. Such a control is performed by, for example, the sequencer 1006 issuing command M to the focal point shift means 1007. In response to the command M, a DC current is supplied to the objective lens actuator 1204. Thus, the objective lens 1203 moves at a predetermined speed in a direction perpendicular to the optical disc 1100.

Sequence 3 ends when a reflective surface (i.e., the surface of the information recording layer 1120) is detected by the reflective surface detection means 1010.

The reflective surface is detected by the same method as the method described with respect to sequence 1.

(Sequence 4)

The sequencer 1006 controls the focus control means so as to perform the focus control to the surface of the information recording layer 1120. This is performed by switching the switch 1008 from off to on.

The sequence 4 ends when the focus control to the information recording layer 1120 is stabilized.

As described above, with the optical disc unit 1001 according to the present invention, focusing having two steps is performed with the control by the sequencer 1006. The first step of the focusing is the focusing to the surface of the protective layer 1110. The second step of the focusing is the focusing to the surface of the information recording layer 1120. With such a focusing having two steps, a risk of the objective lens 1203 colliding into the optical disc 1100 can be significantly reduced. The reason will be described in detail below.

In sequences 1 and 2, the first step of the focusing is performed to the surface of the protective layer 1110 not to the surface of the information recording layer 1120. The focusing is performed to a position which is distant from that in a conventional method by the thickness of the protective layer 1110. In other words, the working distance is extended by the thickness of the protective layer 1110.

For example, if the original working distance (i.e., the distance between the surface of the protective layer 1110 and the objective lens 1203 when the focus is on the information recording layer 1120) is 150 μm, the substantial working distance is 250 μm, which is the original working distance plus the thickness of the protective layer 1110, 100 μm. Therefore, even if wobbling of about 200 μm is generated by rotations of the optical disc 1100, it is possible to avoid collision of the objective lens 1203 into the surface of the protective layer 1110 due to a focusing failure in most cases.

In addition, in sequence 2, tracking control to the wobbling of the optical disc 1100 is performed. Thus, in sequences 3 and 4, the influence of the wobbling of the optical disc 1100 can be virtually ignored. This is because the information recording layer 1120 and the protective layer 1110 undergo the same wobbling.

In sequence 4, the relative speed of the information recording layer 1120 to which the focusing is going to be performed and the objective lens 1203 is substantially zero. Thus, the optical disc 1100 can be regarded to be substantially static (in the direction of wobbling). In sequence 3, the focus control loop is blocked, but the operation state of the actuator before blocking the focus control loop is kept almost as it is. As a result, in sequences 3 and 4, the focusing to the information recording layer 1120 can be performed almost surely.

As described above, according to Embodiment 1 of the present invention, even if the optical head having the objective lens of high NA is used, it is possible to avoid the collision of the objective lens into the surface of the optical disc as much as possible by performing the focus control to the surface of the protective layer 1110, and then performing the focus control to the information recording layer 1120.

Usually, the reflectance R1110 of the surface of the protective layer 1110 and the reflectance R1120 of the information recording layer 1120 are different. The sequencer 1006 appropriately sets a gain using a gain amplifier 1009 in order to correct differences between the reflectance R1110 and the reflectance R1120.

A feedback gain G1110 when the focus control to the surface of the protective layer 1110 is performed in sequence 2 and a feedback gain G1120 when the focus control to the surface of the information recording layer 1120 is performed in sequence 4 are preferably set to meet formula (1).

$$R1110 \times G1110 = R1120 \times G1120 \tag{1}$$

G1110 and G1120 are preferably set such that the product of R1110 and G1110 equals the product of R1120 and G1120.

Setting the feedback gains G1110 and G1120 to meet formula (1) enables a loop gain of the entire control system to be maintained constant. As a result, it is possible to perform a stable focus control to either of the surface of the protective layer 1110 and the surface of the information recording layer 1120.

The reflectance R1110 of the surface of the protective layer 1110 is uniquely determined by the refractive index of the protective layer 1110. On the other hand, the reflectance R1120 of the surface of the information recording layer 1120 significantly varies depending on the material of the information recording layer 1120. For example, if the material of the protective layer 1110 is a polycarbonate resin, which is commonly used, the reflectance of the surface of the protective layer 1110 is in the range of about 3 to 5%. The reflectance R1120 of the surface of the information recording layer 1120 is in the range of 5 to 20% in the case of a recordable and erasable media (for example, a phase change film), 20 to 50% in the case of a rewritable media (for example, a pigment type material), and 70 to 90% in the case of read-only media (for example, an aluminum reflective film). The reflectance R1120 of the surface of the information recording layer 1120 significantly varies depending on the material thereof. Thus, there is no guarantee that the relationship which meets formula (1) is established unless the reflectance R1120 of the surface of the information recording layer 1120 is known at the time of the focusing. Thus, there may be the case where the focusing to the information recording layer 1120 cannot be performed stably.

In order to surely obtain the reflectance R1120 of the surface of the information recording layer 1120, for example, information indicating the reflectance R1120 may be formed on the surface of the protective layer 1110 of the optical disc 1100 beforehand so as to allow the information indicating R1120 to be read from the surface of the protective layer 1110 by using the information reading means 1011 during sequence 2 (i.e., during the focusing to the surface of the protective layer 1110). In sequence 4, the sequencer 1006 sets a control gain based on the reflectance R1120 using the gain amplifier 1009.

Figure 3:
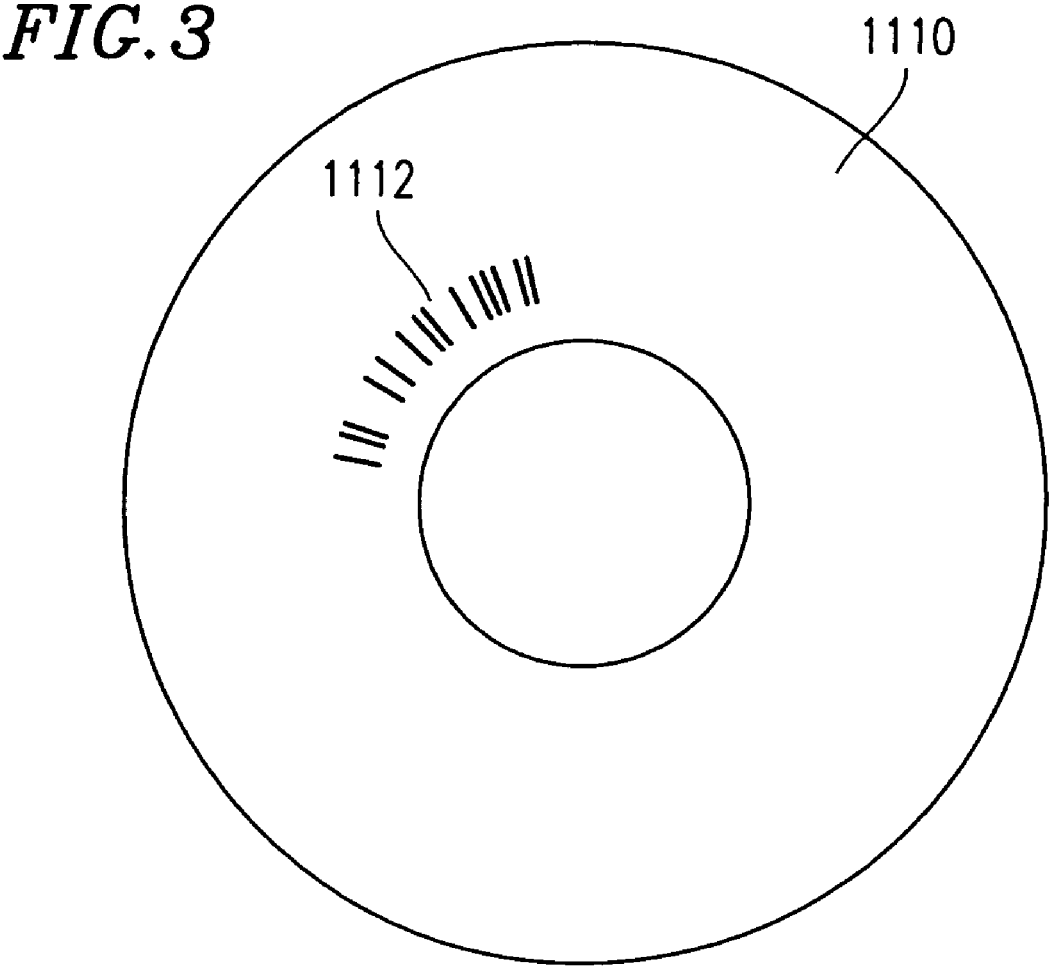
FIG. 3 shows an example of an optical disc on which disc information is formed on a surface of a protective layer.

FIG. 3 shows an example of an optical disc on which disc information 1112 is formed on the surface of the protective layer 1110. The information indicating the reflectance R1120 of the surface of the information recording layer 1120 is included in at least part of the disc information 1112. The disc information 1112 may be a bar code directly printed on the surface of the protective layer 1110 or may be a label with a bar code or the like printed which is to be attached. The information reading means 1011 may have any structure as long as it compares every addition signal of the signal group DOUT which is output from the light receiving means 1202 with a predetermined threshold value and converts the bar code into a binary value based on the comparison result for detection.

(Embodiment 2)

Figure 4:
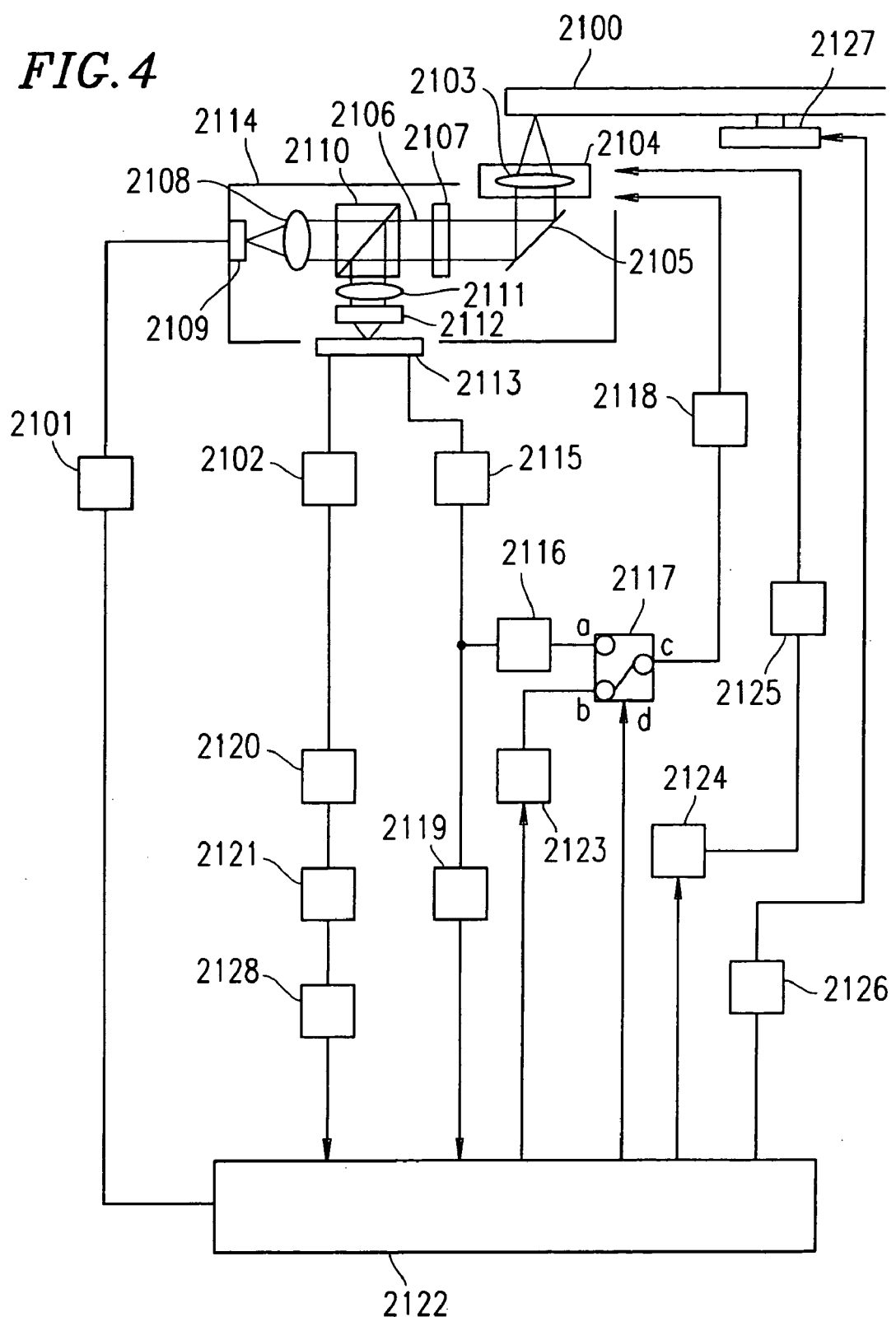
FIG. 4 is a block diagram showing an exemplary structure of an optical disc unit according to Embodiment 2 of the present invention.

FIG. 4 shows an exemplary structure of the optical disc unit 2002 according to Embodiment 2 of the present invention.

In the present embodiment, a photodetector 2113 and a TE signal generation circuit 2102, which will be described later, act as tracking error detection means. The tracking error detection means detects a misalignment between an optical beam applied to an optical disc 2100 having an information surface with a plurality of tracks formed thereon and one of the tracks which corresponds thereto, and outputs a tracking error signal which indicates the misalignment.

The photodetector 2113, an FE signal generation circuit 2115, a phase compensation circuit 2116, a power amplifier 2118 and an actuator 2104 act as focus control means. The focus control means performs a focus control such that a distance between a focal point of the optical beam and the information surface of the optical disc 2100 is within a predetermined error limit.

A microcomputer 2122 acts as control means for controlling the focus control means and the actuator 2104 (shift means).

The optical disc 2100 is attached to a motor 2127 and rotates with a predetermined number of rotations. The motor 2127 is controlled by a motor control circuit 2126. The number of rotations of the motor 2127 is set by the microcomputer 2122.

Figure 6:
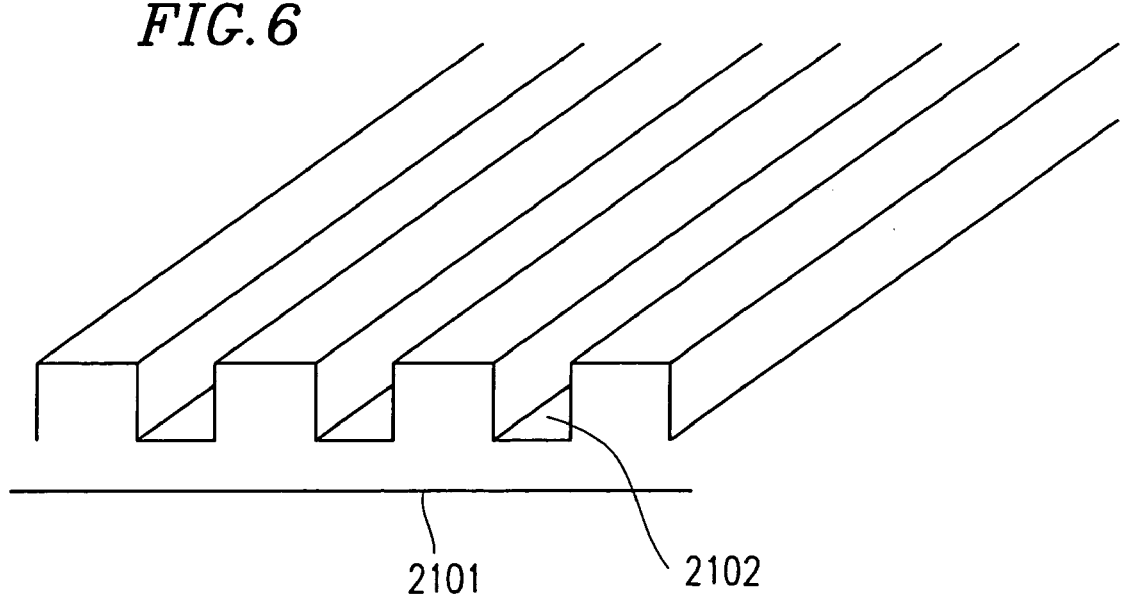
FIG. 6 schematically shows tracks formed on the optical disc.
Figure 22:
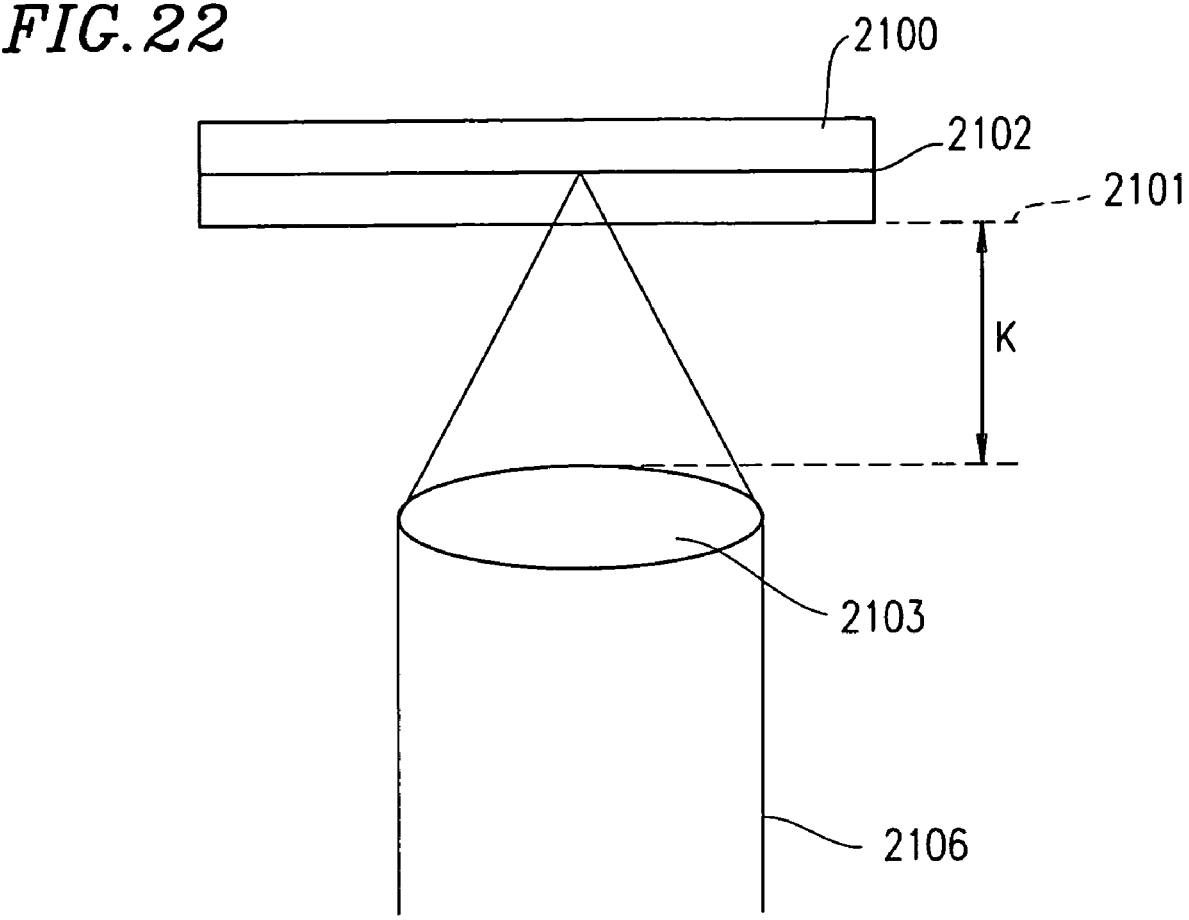
FIG. 22 illustrates a working distance.

The optical disc 2100 has an information surface with a plurality of tracks formed thereon (not shown in FIG. 4, see FIGS. 6 and 22). The plurality of tracks are formed in spiral forms with concave and convex portions. The optical disc 2100 may be a single-layer disc or may be a multilayer disc, including a doublelayer disc.

A laser 2109, a coupling lens 2108, a polarized light beam splitter 2110, a ¼ waveplate 2107, a total internal reflection mirror 2105, the photodetector 2113, and the actuator 2104 are attached to the optical head 2114.

The laser 2109 is connected to a laser control circuit 2101. The laser control 2101 drives the laser 2109 so as to have the light emitting power set by the microcomputer 2122. An optical beam 2106 generated by the laser 2109 attached to the optical head 2114 is collimated into parallel light by the coupling lens 2108, and passes through the polarized light beam splitter 2110 and the ¼ waveplate 2107. Then, the light is reflected off the total internal reflection mirror 2105 and focused and applied onto the information surface of the optical disc 2100 by an objective lens 2103.

The light reflected off the information surface of the optical disc 2100 passes the objective lens 2103 and is reflected off the total internal reflection mirror 2105. Then, it passes through the ¼ waveplate 2107, the polarized light beam splitter 2110, a detection lens 2111, and a cylindrical lens 2112 and incident in the photodetector 2113 comprising four light receiving sections. The objective lens 2103 is attached to a movable portion of the actuator 2104. The actuator 2104 which acts as both the focusing direction shift means and the tracking direction shift means includes a focusing coil, a tracking coil, a permanent magnet for focusing, and a permanent magnet for tracking. When a voltage is applied to the focusing coil of the actuator 2104 by using the power amplifier 2118, a current flows through the coil. The coil receives a magnetic force from the permanent magnet for focusing.

Thus, the objective lens 2103 moves in a direction perpendicular to the information surface of the optical disc 2100 (an up-and-down direction in the figure). The objective lens 2103 is controlled based on the focus error signal which indicates a misalignment between the focal point of the optical beam and the information surface of the optical disc such that the focal point of the optical beam 2106 is always on the information surface of the optical disc 2100.

When a voltage is applied to the tracking coil by using a power amplifier 2125, a current flows through the coil. The coil receives a magnetic force from the permanent magnet for tracking. Thus, the objective lens 2103 moves in a radial direction of the optical disc 2100 (a direction traversing the tracks on the optical disc 2100, a right-and-left direction in the figure).

The photodetector 2113 is formed of four light receiving sections. The light reflected off the optical disc and incident on the photodetector 2113 is sent to the focus error signal generation circuit 2115 (hereinafter, referred to as the FE signal generation circuit 2115) and a tracking error signal generation circuit 2102 (hereinafter, referred to as the TE signal generation circuit 2102). The FE signal generation circuit 2115 generates a focus error signal (hereinafter, referred to as the FE signal) which indicates a misalignment between the focal point of the optical beam 2106 and the information surface of the optical disc 2100.

The optical system shown in FIG. 4 has a structure which implements a detection scheme of the FE signal which is generally referred to as an astigmatism method. The FE signal is sent to the power amplifier 2118 via a phase compensation circuit 2116 and a switch 2117.

A current flows to the focusing coil of the actuator 2104 by the power amplifier 2118. The phase compensation circuit 2116 is a filter which forwards a phase for stabilizing the focus control system. Thus, the objective lens 2103 is driven in response to the FE signal and the focal point of the optical beam 2106 is always on the information surface.

The switch 2117 switches between a connection of a terminal a and a terminal c, and a connection between a terminal b and the terminal c in accordance with a potential at a control terminal d. In the present embodiment, when the potential at the control terminal d is high, the terminal c and the terminal a are connected. When the potential is low, the terminal c and the terminal b are connected. The FE signal is also sent to a zero-cross detection circuit 2119. When the zero-cross detection circuit 2119 detects that the FE signal crosses zero, it outputs a pulse signal. Hereinafter, the pulse is referred to as a zero-cross signal.

The optical system shown in FIG. 4 has a structure which implements a tracking error signal detection scheme which is generally referred to as a push-pull method. Hereinafter, the tracking error signal is referred to as the TE signal. The TE signal generation circuit 2102 detects a misalignment between the optical beam 2106 focused and applied onto the information surface of the optical disc 2100 with the plurality of tracks formed thereon and the tracks of the optical disc 2100 by the push-pull method. The TE signal is sent to a comparator 2128 via a band-pass filter 2120 (hereinafter, referred to as BPF 2120) and an amplification detection circuit 2121.

The output from the comparator 2128 is sent to the microcomputer 2122. A ramp generation circuit 2123 generates a signal which varies in a constant rate (i.e., a ramp waveform). The time period for generating the ramp wave is set by the microcomputer 2122. The output from the ramp generation circuit 2123 is sent to the power amplifier 2118 via the switch 2117. The switch 2117 is switched by the microcomputer 2122. A sine wave generation circuit 2124 generates sine wave. The time period for generating the sine wave is set by the microcomputer 2122. The output from the sine wave generation circuit 2124 is sent to the power amplifier 2125.

Now, an operation of focusing is described. The microcomputer 2122 sets the predetermined number of rotations to the motor control circuit 2126, and then sets the predetermined light-emitting power to the laser control circuit 2101. The microcomputer 2122 makes the potential at the control terminal d of the switch 2117 low to connect the terminal c and the terminal b. At this time, the focus control is not being performed. The ramp generation circuit 2123 is activated to output the ramp wave. The current according to the ramp wave flows through the focusing coil by the power amplifier 2118.

The objective lens 2103 moves toward the optical disc 2100 (in an upper direction in the figure). At the same time, the microcomputer 2122 activates the sine wave generation circuit 2124 and a sine current flows through the tracking coil by the power amplifier 2125. The objective lens 2103 wobbles in a sine wave form in a direction traversing the tracks.

As described above, the objective lens 2103 approaches the optical disc 2100 with wobbling in the direction traversing the tracks. When the focal point of the optical beam 2106 approaches the information surface of the optical disc 2100 and begins to traverse the tracks, the TE signal from the TE signal generation circuit 2102 is in the sine-wave form. The TE signal is sent to the amplification detection circuit 2121 via the BPF 2120. Amplification detection means, i.e., the amplification detection circuit 2121, measures the amplification of the TE signal with the optical beam moving in a direction orthogonal to the tracks. BPF 2120 removes noises. The passband of the BPF 2120 is the frequency of the TE signal. The frequency of the TE signal depends on the pitch and decentration of the tracks and the number of rotations of the optical disc. In terms of a usual optical disc unit and an optical disc, it ranges from tens Hz to several KHz.

The amplification of the TE signal is detected by the amplification detection circuit 2121. When the amplification of the detected TE signal becomes a predetermined value or higher, the output from the comparator 2128 becomes high and the focal point of the optical beam is detected to be near the information surface. Then, the focal point of the optical beam passes the information surface. The FE signal which is output from the FE signal generation circuit 2115 crosses zero. At this time, the zero-cross signal is output from zero-cross detection means, i.e., the zero-cross detection circuit 2119.

The microcomputer 2122 judges that the focal point is on the information surface of the optical disc 2100 when the output from the comparator 2128 is at the high-level and when the zero-cross signal is output from the zero-cross detection circuit 2119. In this case, the microcomputer 2122 makes the potential at the control terminal d high and connects the terminal c and the terminal a of the switch 2117 to start the focus control operation.

The microcomputer 2122 controls rotations of the optical disc 2100 so that the number of rotations of the optical disc 2100 when the amplification detection circuit 2121 detects the amplification of the TE signal is smaller than the number of the rotations of the optical disc 2100 when the information recorded on the information surface of the optical disc 2100 is being reproduced. Such a control is achieved by, for example, by controlling the number of rotations of rotation means for rotating the optical disc, i.e., the motor 2127. The microcomputer 2122 increases the number of rotations of the motor 2127 to the normal number of rotations for reproducing information after the focus control has been started. By lowering the number of rotations of the optical disc 2100 when the amplification of the TE signal is being detected as described above, the speed of in the focusing direction to the information surface, which may be increased due to the wobble of the optical disc 2100, can be decreased. Accordingly, the time period during which the information surface is in the depth of focus can be longer, and thus the number of tracks across which the optical beam 2106 traverses can be increased. As a result, it is possible to detect the amplification of the TE signal accurately.

The microcomputer 2122 controls the strength of the optical beam such that the optical beam when the amplification detection circuit 2121 detects the amplification of the TE signal is smaller than the strength of the optical beam when the information recorded on the information surface of the optical disc 2100 is being reproduced. Such a control is achieved by controlling the light-emitting power of the laser 2109. The microcomputer 2122 increases the light-emitting power of the laser 2109 to the normal power for reproducing the information after the focus control has been started. By lowering the power of the optical beam when the amplification of the TE signal is being detected as described above, the information recorded on the optical disc 2100 can be prevented from being destroyed.

Figure 5:
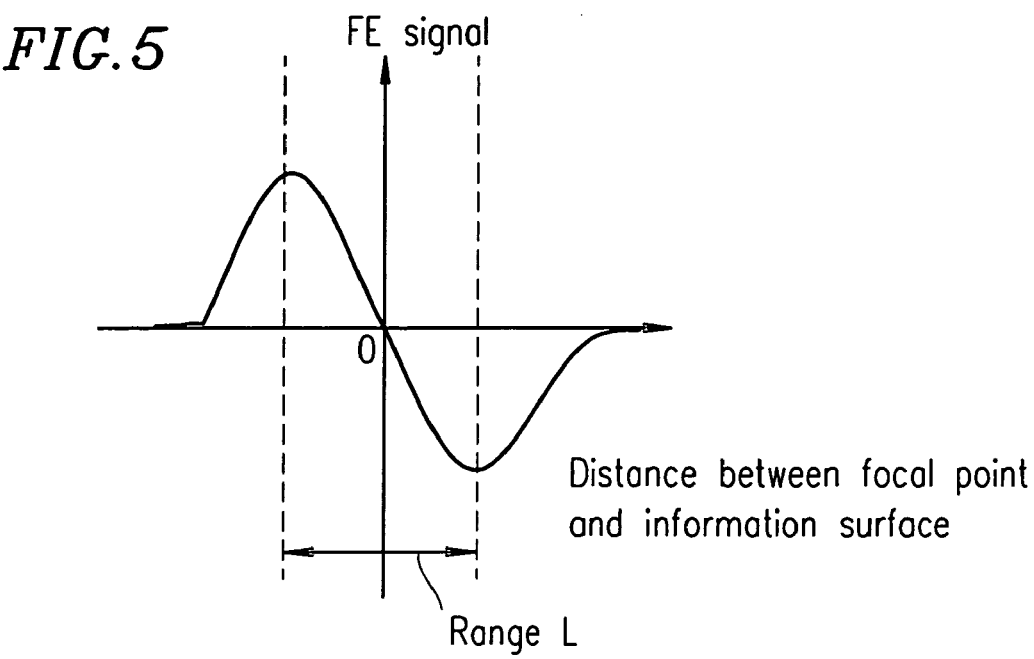
FIG. 5 shows an example of a change in the FE signal.

FIG. 5 shows an example of a change in the FE signal. In FIG. 5, a horizontal axis indicates a distance between the focal point of the optical beam 2106 focused with the objective lens 2103 and the information surface of the optical disc 2100. A vertical axis indicates the level of the FE signal. The FE signal has a waveform similar to an s-shape. Hereinafter, the waveform is referred to as the s-shape waveform. The zero level of the FE signal indicates that the focal point of the optical beam matches the information surface (i.e., is focused). The level of the FE signal is at the maximum value when the distance is about 10 µm. As the distance becomes longer, the FE signal comes closer to zero. Thus, before the focus control operation, it is required to perform an initial operation for the focus control to bring the distance between the focal point of the optical beam 2106 and the information surface in the range L of FIG. 5.

FIG. 6 schematically shows the tracks formed on the optical disc 2100. The optical beam 2106 is applied from the lower side in the figure. The tracks are convex portions with respect to the lower side in the figure. In FIG. 6, the information surface of the optical disc 2100 is indicated by the reference numeral 2101 and the surface of the optical disc 2100 is indicated by the reference numeral 2102.

The tracking error detection scheme which is generally called a push-pull method is described. The push-pull method is also referred to as a far-field method. In this method, the TE signal is detected by a difference in outputs from the light-receiving sections of the photodetector divided in two and positioned symmetrically with respect to the center of the tracks, which receives an optical beam reflected and diffracted with the tracks on the optical disc 2100.

Figure 7:
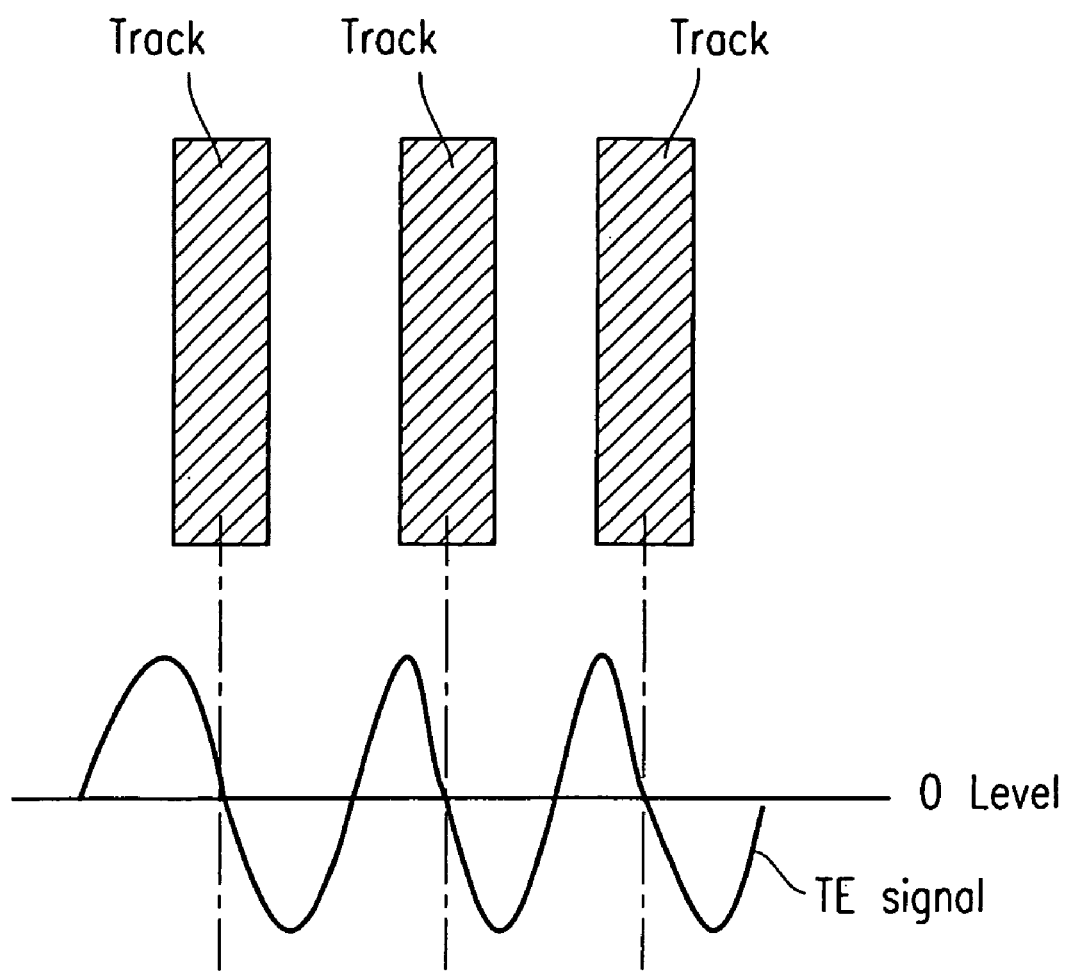
FIG. 7 shows a waveform of a TE signal when the optical beam traverses the tracks.

FIG. 7 shows a waveform of the TE signal when the optical beam 2106 traverses the tracks. When the optical beam 2106 traverses the tracks, the TE signal is in the sine waveform. The TE signal is zero at the center of each of the tracks.

Figure 8:
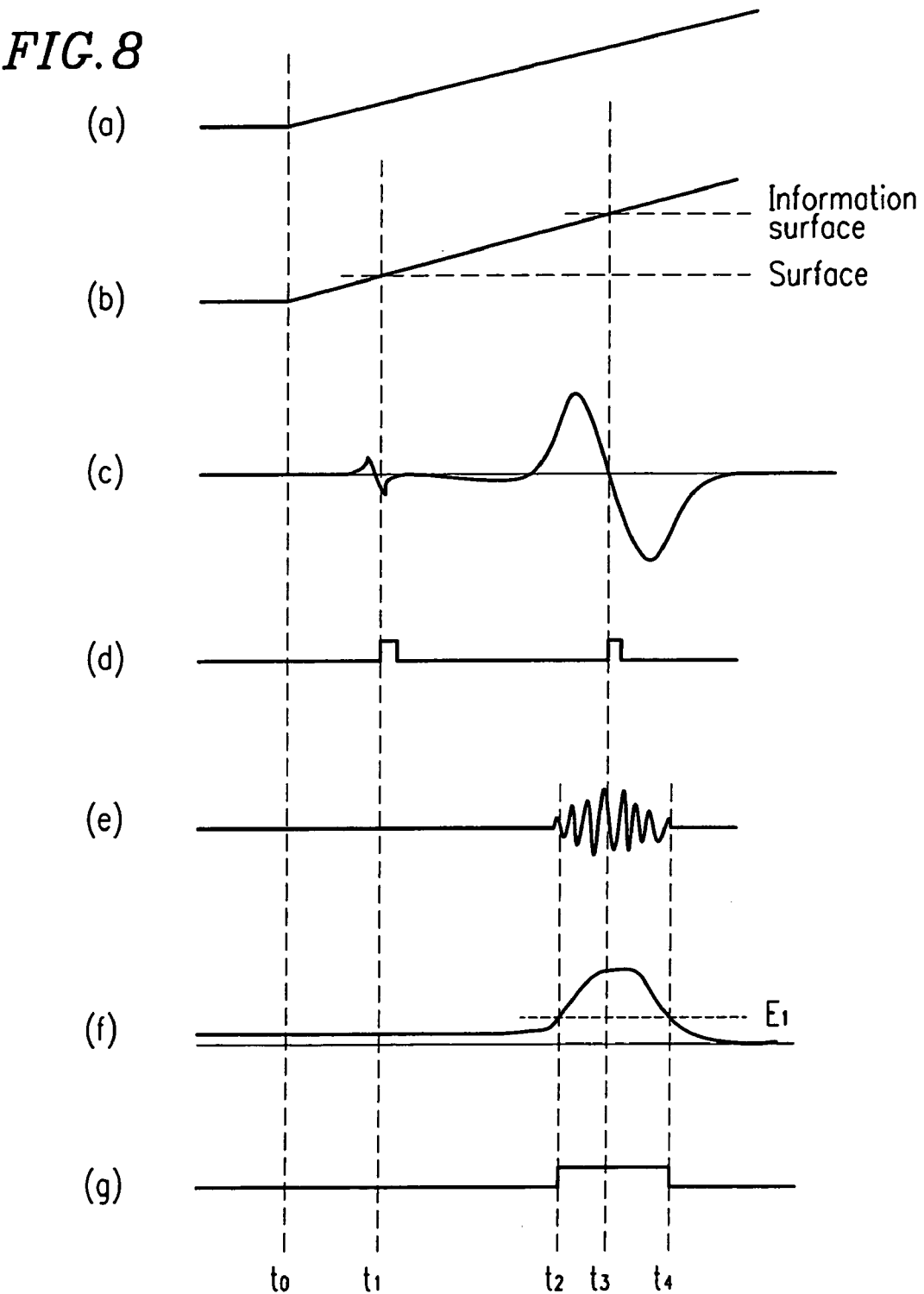
FIG. 8 shows waveforms of the signals when the objective lens gradually approaches the information surface of the optical disc.

FIG. 8 shows waveforms of the signals when the objective lens 2103 gradually approaches the information surface of the optical disc 2100. In FIG. 8, waveform (a) represents the output of the ramp generation circuit 2123, waveform (b) represents the focal point, waveform (c) represents the FE signal, waveform (d) represents the zero-cross signal, waveform (e) represents the TE signal, waveform (f) represents an output from the amplification detection circuit 2121, and waveform (g) represents the output of the comparator 2128.

When the microcomputer 2122 starts the operation of the ramp generation circuit 2123 at time $t_0$, a current corresponding there to flows through the focusing coil. Thus, the objective lens 2103 gradually approaches the information surface of the optical disc 2100. The zero-cross signal is output when the focal position matches the surface of the optical disc at time $t_1$. However, the level of the TE signal is zero at the optical disc surface. Thus, the output of the comparator 2128 remains at the low level. Further, as the focal position further approaches the optical disc 2100, the information surface enters the depth of focus. Thus, the TE signal is in the sine waveform. Accordingly, the output from the amplification detection circuit 2121 exceeds $E_1$ and the output of the comparator 2128 becomes high.

At time $t_3$, the zero-cross signal is output when the focal point matches the information surface. As the objective lens 2103 is further raised, the information surface goes out of the depth of focus. Thus, the TE signal reaches the zero level. At time $t_4$, the output from the comparator 2128 becomes low. As described above, the zero-cross signal is output at the surface of the optical disc 2100. However, since the output of the comparator 2128 is low, the information surface can be detected surely. Specifically, if the unit has the structure in which the microcomputer 2122 makes the potential at the control terminal d high to connect the terminal c and the terminal a of the switch 2117 at time $t_3$, the focusing to the information surface can be performed surely even if the reflectance of the information surface is low such as in the doublelayer optical disc.

Figure 9:
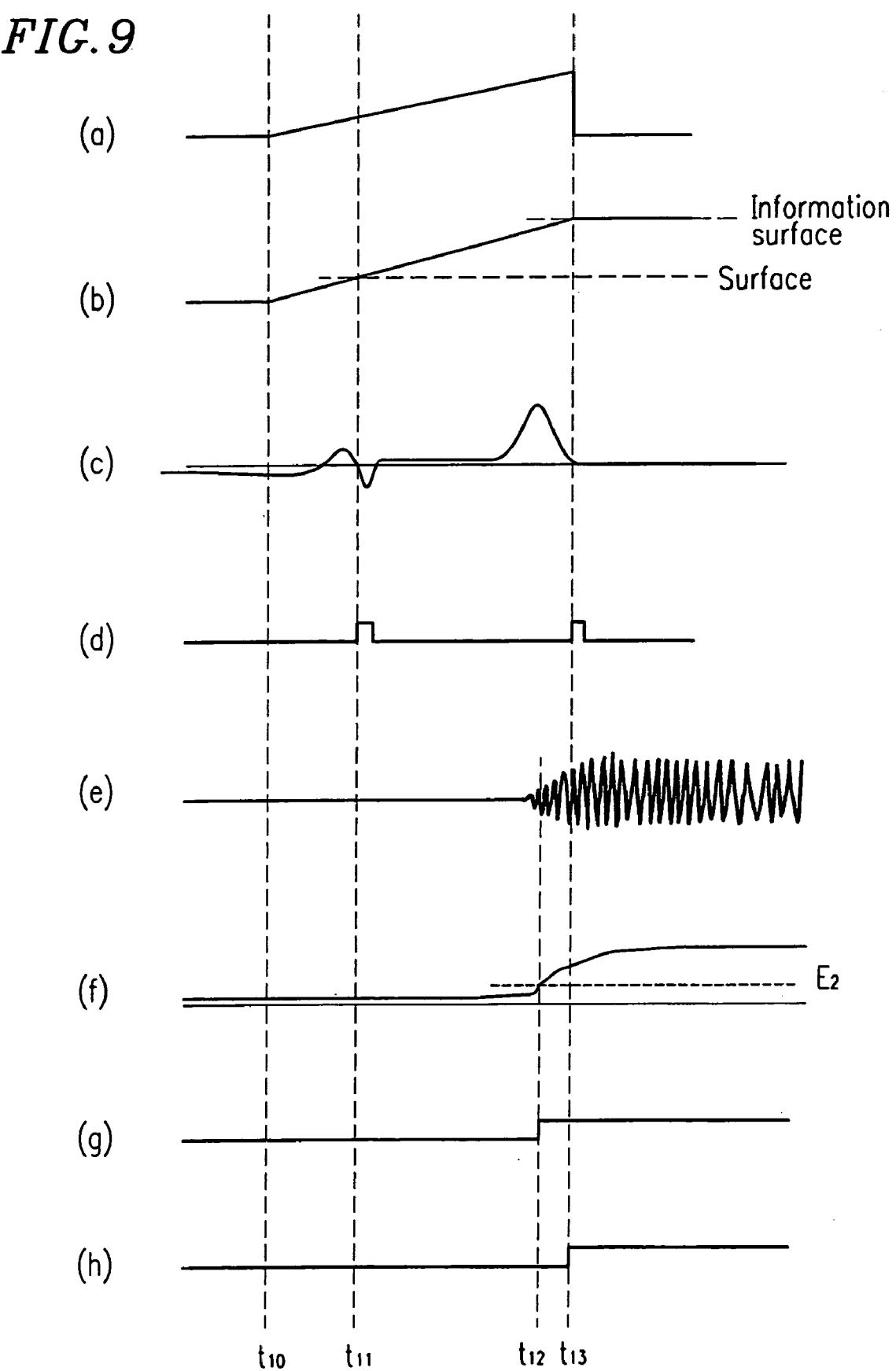
FIG. 9 shows waveforms of the signals when focusing is being performed.

FIG. 9 shows waveforms of the signals when the focusing is being performed. In FIG. 9, waveform (a) represents the output from the ramp generation circuit 2123, waveform (b) represents the focal point, waveform (c) represents the FE signal, waveform (d) represents the zero-cross signal, waveform (e) represents the TE signal, waveform (f) represents the output from the amplification detection circuit 2121 and the waveform (g) represents the output from the comparator 2128.

Waveform (h) represents the control signal which is output to the control terminal d of the switch 2117 by the microcomputer 2122. At $t_{10}$, the ramp generation circuit 2123 starts operation. At time $t_{12}$, the output from the comparator 2128 becomes high.

At time $t_{13}$, the focal point matches the information surface and the zero-cross signal is output. The microcomputer 2122 makes the potential at the control terminal d of the switch 2117 high.

Therefore, the terminal c and the terminal a of the switch 2117 is connected and the focus control is operated. The focus control of the objective lens 2103 is performed such that the focal point is on the information surface.

The FE signal also crosses zero at the surface of the optical disc 2100. However, the level of the TE signal at the surface of the optical disc 2100 is zero. Accordingly, the microcomputer 2122 does not activate the focus control. Thus, it is possible to perform the accurate focusing to the information surface.

In the case where the optical disc 2100 is a disc on which the information is prerecorded (for example, a ROM), the information surface may be detected based on an RF signal. Such detection can be achieved by adding a total internal reflection detection circuit and an RF detection circuit to the structure of the optical disc unit 2002 shown in FIG. 4.

(Embodiment 3)

Figure 10:
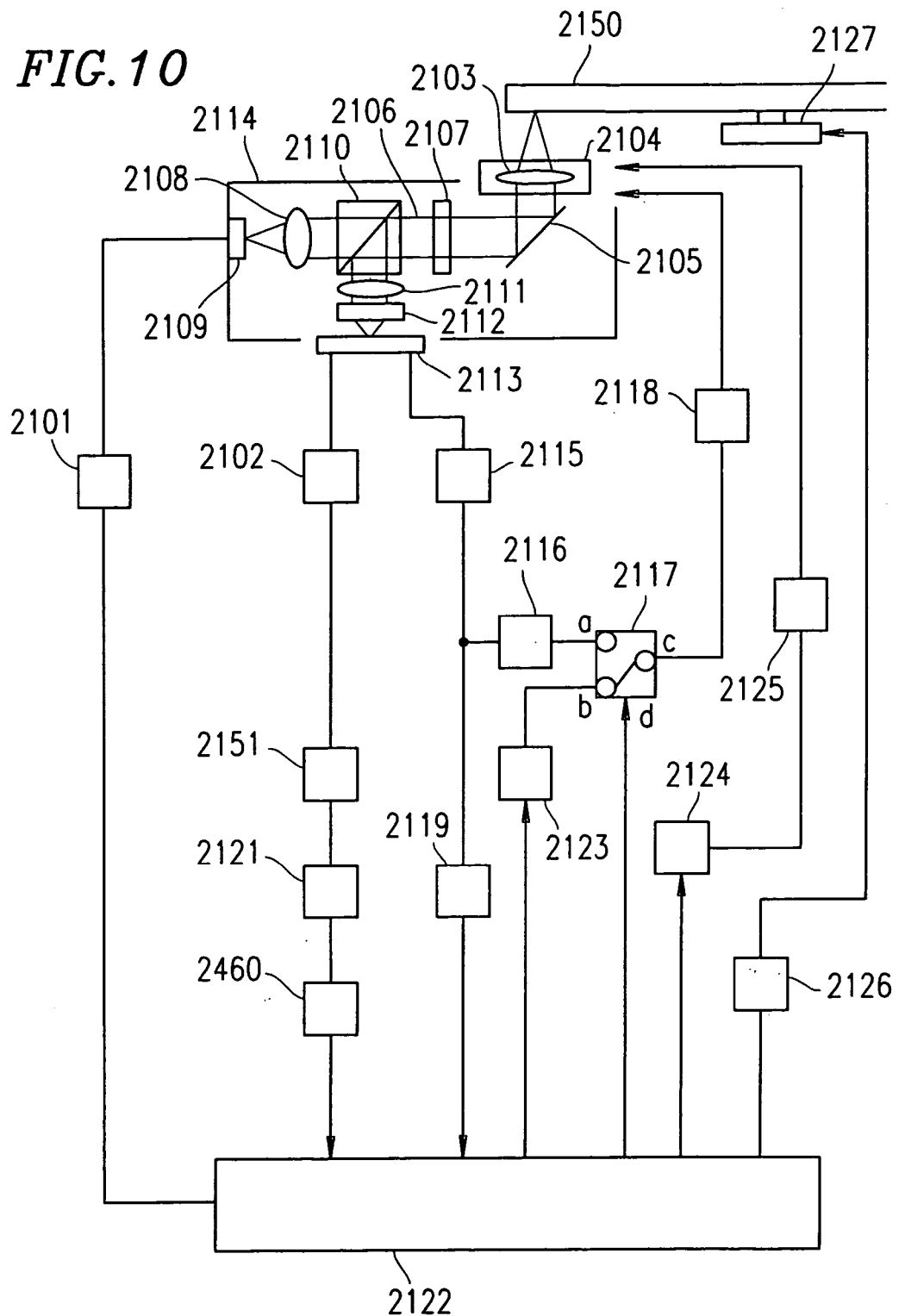
FIG. 10 is a block diagram showing an exemplary structure of an optical disc unit of Embodiment 3.

FIG. 10 shows an exemplary structure of an optical disc unit 2003 of Embodiment 3. In FIG. 10, like blocks as in the above embodiments are indicated by like reference numerals, and the explanations thereof are omitted.

Figure 11:
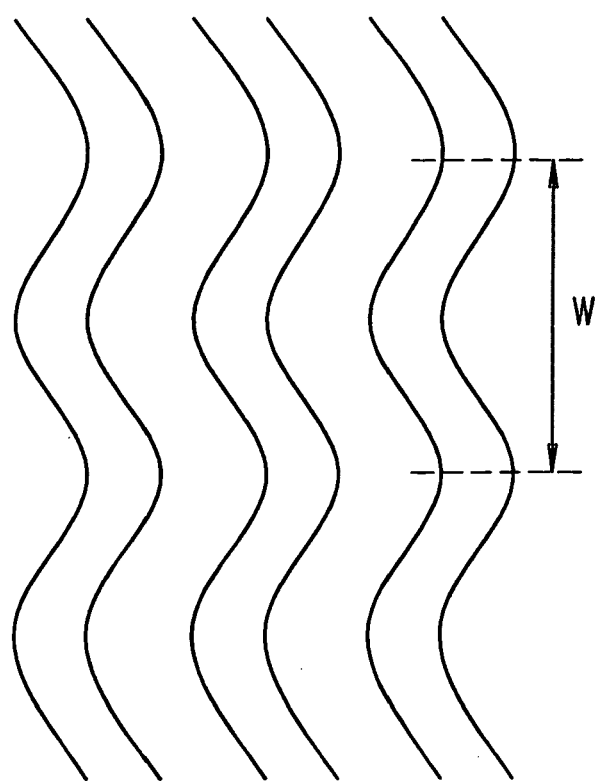
FIG. 11 shows a plurality of tracks formed on the information surface of the optical disc.

FIG. 11 shows a plurality of tracks formed on an information surface of an optical disc 2150. Each of the tracks is wavy. In the exemplary structure shown in FIG. 11, each of the tracks slightly wobbles in a radial direction thereof with a predetermined period W. These slight wobbles can be detected by the TE signals as a misalignment between the optical beam 2106 and the tracks. The optical disc 2150 may be a single-layer disc, or a multilayer disc, including a doublelayer disc.

Figure 12:
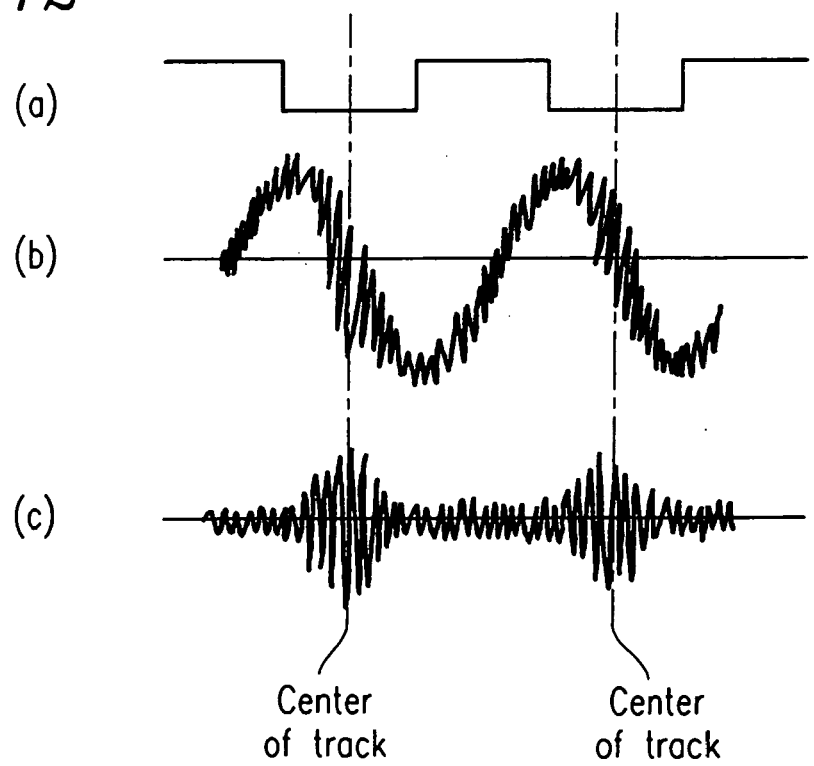
FIG. 12 shows waveforms of the signals when the optical beam traverses the tracks with the focus control being performed.

FIG. 12 shows waveforms of the signals when the optical beam 2106 traverses the tracks with the focus control being performed, wherein (a) schematically represents the tracks. Waveform (b) represents a TE signal. Waveform (c) represents an output from a BPF 2151. Hereinafter, the output from the BPF 2151 is referred to as a wobble signal. Amplification of the wobble signal is maximum when the optical beam 2016 locates at the center of a track and small when the optical beam 2016 is between the tracks. The BPF 2151 passes components due to slight wobbles in the radial direction of the tracks included in the TE signal. Accordingly, a pass band of the BPF 2151 depends on W and the number of rotations of the optical disc 2150.

Figure 13:
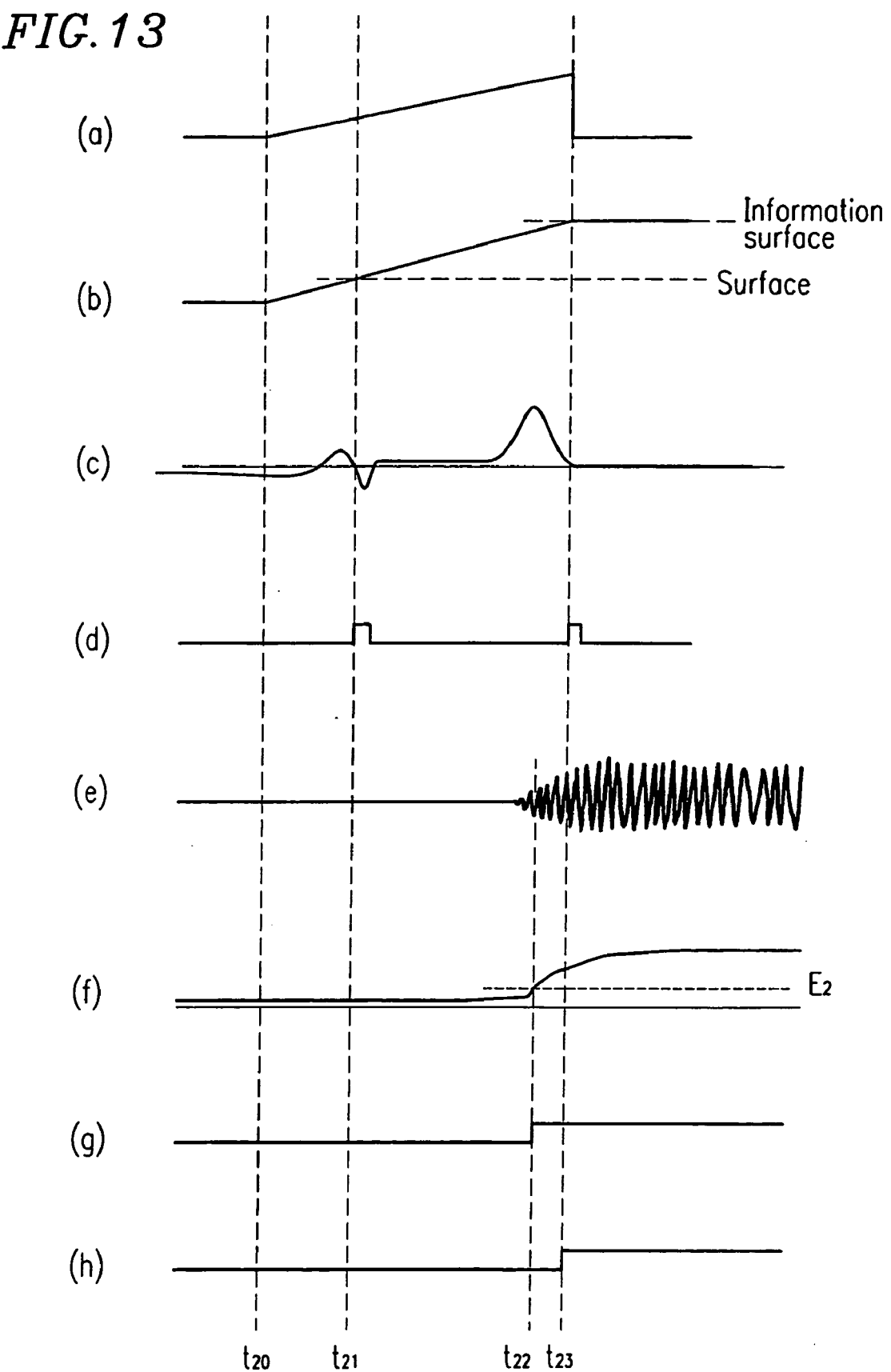
FIG. 13 shows waveforms of the signals used in the optical disc unit.

FIG. 13 shows waveforms of the signals used in the optical disc unit 2003. Waveform (a) represents the output from the ramp generation circuit 2123, waveform (b) represents a focal point, waveform (c) represents the FE signal, waveform (d) represents a zero-cross signal, waveform (e) represents the wobble signal, waveform (f) represents the output from an amplification detection circuit 2121, the waveform (g) represents the output from a comparator 2460 and waveform (h) represents the signal of the control terminal d of the switch 2117. The microcomputer 2122 activates the ramp generation circuit 2123 at time $t_{20}$, and a current corresponding thereto is supplied to the focusing coil.

As described above, the objective lens 2103 gradually approaches the information surface of the optical disc 2150. At time $t_{21}$, when the focal point matches a surface of the optical disc 2150, the zero-cross signal is output. Since the level of the wobble signal is zero, the output from the comparator 2460 remains low. When the focal point further approaches the optical disc, at time $t_{22}$, the information surface enters the depth of focus. Thus, the wobble signals become the sine wave form signals. The output from the amplification detection circuit 2121 exceeds $E_2$, and thus, the output from the comparator 2460 becomes high. At time $t_{23}$, when the focal point matches the information surface, the zero-cross signal is output. The microcomputer 2122 makes the potential at the control terminal d of the switch 2117 high and connects the terminal c and the terminal a to perform the focus control.

At the surface of the optical disc 2150, the zero-cross signal is output. However, the output from the comparator 2460 is low. Thus, the microcomputer 2122 keeps the level of the potential of the control terminal low. In the switch 2117, the terminal b and the terminal care connected and the focus control is not performed. On the other hand, at the information surface of the optical disc 2150, the zero-cross signal is also detected. In this case, the output from the comparator 2460 is high. Thus, the microcomputer 2122 makes the potential at the control terminal d high. In the switch 2117, the terminal a and the terminal c are connected and the focus control is performed.

With such a structure, even if the reflectance of the information surface is low as in the doublelayer optical disc, it is possible to surely detect the information surface and to surely perform the focusing.

(Embodiment 4)

Figure 14:
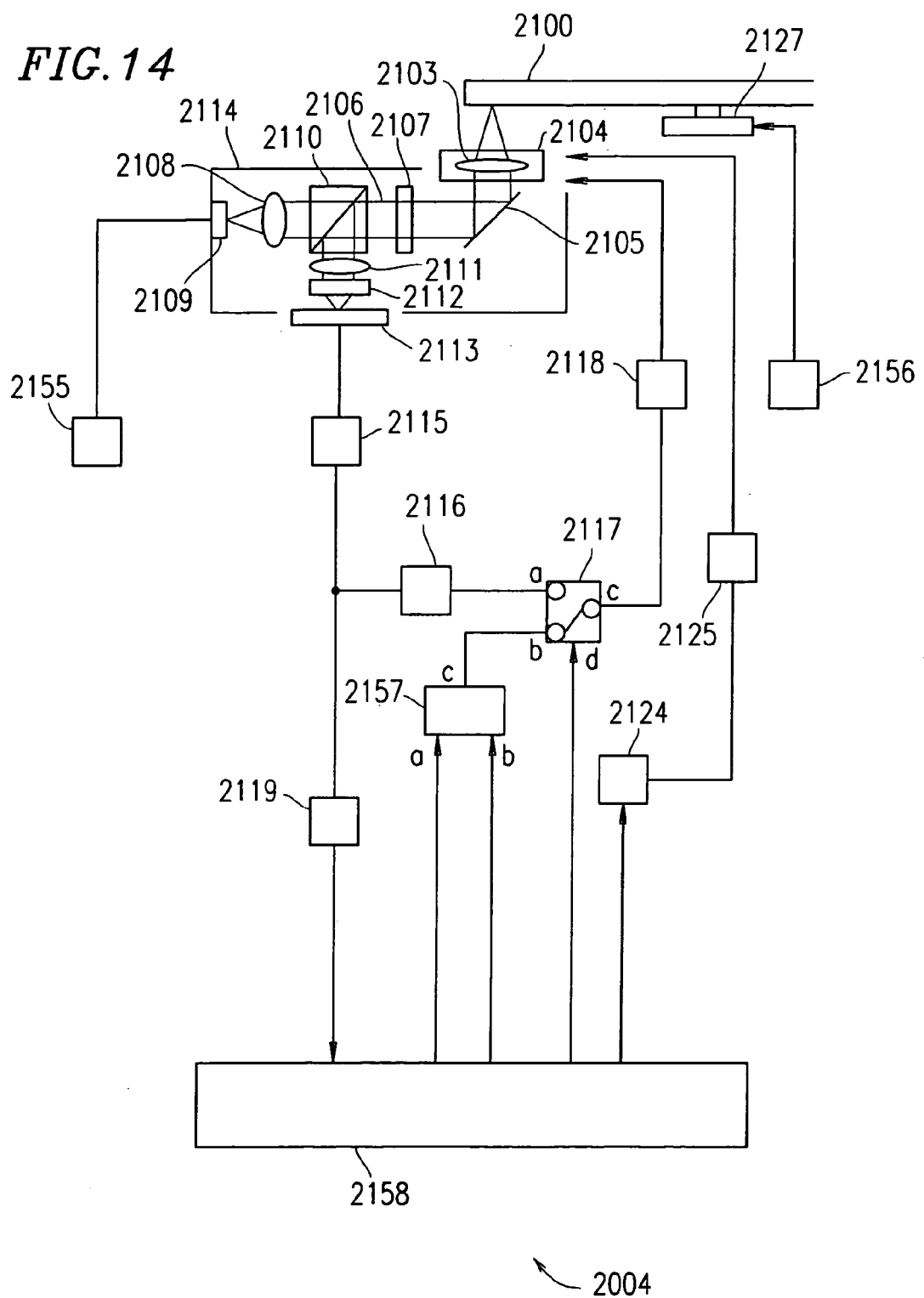
FIG. 14 is a block diagram showing an exemplary structure of the optical disc unit according to Embodiment 4 of the present invention.

FIG. 14 shows an exemplary structure of the optical disc unit 2004 according to Embodiment 4 of the present invention. Like blocks as in the above embodiments are indicated by like reference numerals, and the explanations thereof are omitted.

A ramp generation circuit 2157 generates a signal varying at a constant speed when the potential at the terminal a becomes high. The polarity of the speed is positive when the potential at the terminal b is high and negative when the potential is low. The optical disc 2100 rotates at the predetermined number of rotations. A motor control circuit 2156 controls the motor 2127 so as to rotate with the predetermined number of rotations. A laser control circuit 2155 controls the laser 2109 so as to emit light at a predetermined power.

The focusing operation will be described. A microcomputer 2158 makes the potential at the control terminal d of the switch 2117 low, and connects the terminal c and the terminal b. Next, the microcomputer 2158 makes the potentials of the terminal a and the terminal b of the ramp generation circuit 2157 high. As a result, the ramp generation circuit 2157 generates a signal of a positive polarity varying at a constant speed. A current which corresponds to the output from the ramp generation circuit 2157 flows through the focusing coil by the power amplifier 2128. As a result, the objective lens 2103 moves toward the optical disc 2100 (in an upper direction in the figure). When the focal point of the optical beam 2106 matches the surface of the optical disc 2100, the first zero-cross signal is output from the zero-cross detection circuit 2119.

The microcomputer 2158 changes the potential of the terminal b of the ramp generation circuit 2157 from high to low after a predetermined time period $M_0$ has lapsed from the time when the first zero-cross signal was detected. As a result, the ramp generation circuit 2157 generates a signal of a negative polarity varying at a constant speed after the predetermined time period $M_0$ has lapsed from the time when the first zero-cross signal was detected. Thus, the objective lens 2103 moves in a direction away from the optical disc 2100 (in a lower direction in the figure) and thus the focal point of the optical beam shifts in a direction toward the information surface of the optical disc 2100 (in a lower direction in the figure).

The predetermined time period $M_0$ is set to be longer than the time for the focal point of the optical beam to reach the information surface. Specifically, the predetermined time period $M_0$ is a time period during which the objective lens 2103 can further move in the same direction as the objective lens 2103 moves when the first zero-cross signal is detected by a predetermined distance larger than the thickness of the protective layer of the optical disc 2100. The thickness of the protective layer of the optical disc 2100 is the distance between the surface of the optical disc 2100 and the information surface.

The focal point of the optical beam starts to shift toward the information surface after it passes through the information surface. When the focal point of the optical beam passes through the information surface again, the zero-cross detection circuit 2119 outputs the second zero-cross signal. When the microcomputer 2158 detects that the second zero-cross signal is output (i.e., the focus error signal crosses zero for the second time), it makes the potential at the control terminal d high and connects the terminal c and the terminal a of the switch 2117 to start the focus control.

Figure 15:
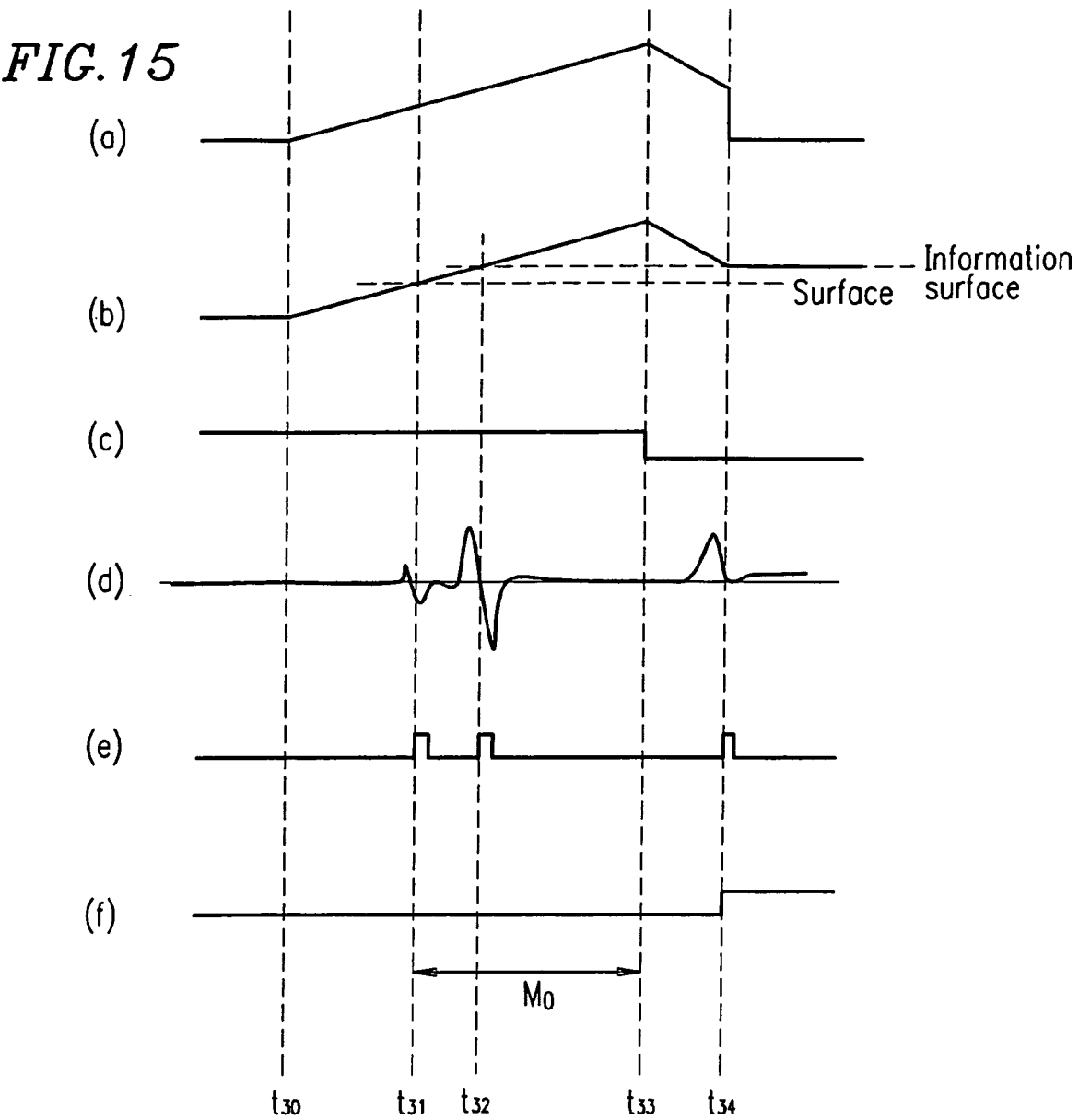
FIG. 15 shows waveforms of the signals used in the optical disc unit.

FIG. 15 shows waveforms of the signals used in the optical disc unit 2004. In FIG. 15, waveform (a) represents the output of the ramp generation circuit 2157, waveform (b) represents the focal point, waveform (c) represents the signal of the terminal b of the ramp generation circuit 2157, waveform (d) represents the FE signal, waveform (e) represents the zero-cross signal, and waveform (f) represents the signal of the terminal d of the switch 2117. The microcomputer 2158 starts the operation of the ramp generation circuit 2157 at time $t_{30}$, a current corresponding thereto flows through the focusing coil.

Accordingly, the objective lens 2103 gradually approaches the information surface of the optical disc 2100. At time $t_{31}$, when the focal point matches the surface of the optical disc 2100, the zero-cross signal is output.

The microcomputer 2158 sets the potential at the terminal b of the ramp generation circuit 2157 low when the time period $M_0$ has lapsed after the first zero-cross signal was detected.

At time $t_{32}$, the focal point and the information surface matches. Thus, the zero-cross signal is output. The output from the ramp generation circuit decreased at a constant speed from time $t_{33}$. Thus, the focal point gradually approaches the information surface. At time $t_{34}$ the focal point matches the information surface, and the zero-cross signal is output. The microcomputer 2158 makes the potential at the control terminal d of the switch 2117 high and connects the terminal c and the terminal a to start the focus control operation.

With such a structure, even if the reflectance of the information surface is low as in the doublelayer optical disc, it is possible to surely detect the information surface and to surely perform the focusing without requiring the TE signal.

In the present scheme, the focal point is once shifted above the information surface. Thus, it is not affected by the zero-cross signal at the surface of the optical disc 2100.

The distance by which the focal point approaches the optical disc 2100 is limited relative to the surface of the optical disc 2100. Thus, the objective lens 2103 does not collide into the surface of the optical disc 2100. The predetermined time period $M_0$ depends on the sensitivity of the focus actuator and the rate of change of the output signal from the ramp generation circuit 2157.

In the present embodiment, the time period $M_0$ has the predetermined amount. However, it may vary depending on a length of a time from time $t_{31}$ to time $t_{32}$. The distance between the surface of the optical disc 2100 and the information surface is predetermined. Thus, the time for moving the distance is proportional to the sensitivity of the actuator.

Accordingly, even if the sensitivity of the actuator changes, it is possible to accurately shift the focal point to above the information surface.

(Embodiment 5)

Figure 16:
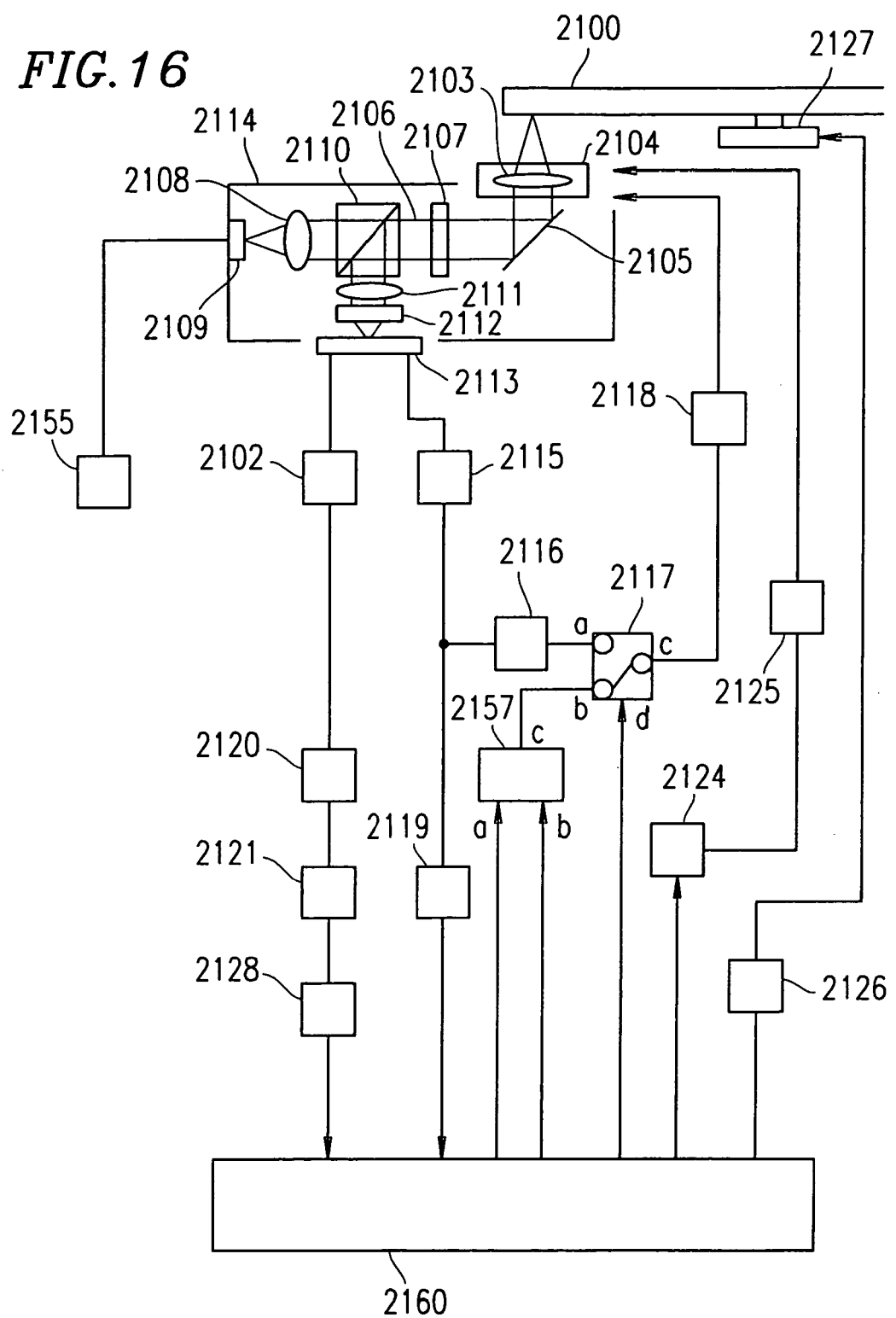
FIG. 16 is a block diagram showing an exemplary structure of an optical disc unit according to Embodiment 5 of the present invention.

FIG. 16 shows an exemplary structure of an optical disc unit 2005 according to Embodiment 5 of the present invention. Like blocks as in the above embodiments are indicated by like reference numerals, and the explanations thereof are omitted.

The focusing operation will be described. A microcomputer 2160 sets zero as the number of rotations of the motor to the motor control circuit 2126. The laser control circuit 2155 controls the laser 2109 to emit light at a predetermined power. The microcomputer 2160 changes the potential at the control terminal d of the switch 2117 to low to connect the terminal c and the terminal b. Then, the microcomputer 2160 changes the potentials at both the terminal a and the terminal b of the ramp generation circuit 2157 to high. As a result, the ramp generation circuit 2157 generates a signal of a positive polarity varying at a constant speed. A current corresponding to the output of the ramp generation circuit 2157 flows through the focusing coil by a power amplifier 2118. As a result, the objective lens 2103 shifts toward the optical disc 2100 (in an upper direction in the figure).

The microcomputer 2160 changes the potential at the terminal b of the ramp generation circuit 2157 from high to low after a predetermined time period $M_1$ has lapsed after the first zero-cross signal was detected. Thus, the ramp generation circuit 2157 generates a signal of a negative polarity varying at a constant speed after the predetermined time period $M_1$ has lapsed since the first zero-cross signal was detected. As a result, the objective lens 2103 gradually recedes from the optical disc 2100.

The predetermined time period $M_1$ is set to be sufficiently longer than the time for the focal point to reach the information surface. Specifically, the predetermined time period $M_1$ is set to be a time period during which the objective lens 2103 can move by a distance larger than the thickness of the protective layer of the optical disc 2100. The microcomputer 2160 makes the potential at the control terminal d of the switch 2117 high when the first zero-cross signal after the potential at the terminal b of the ramp generation circuit 2157 is changed to low is detected, and connects the terminal c and the terminal a of the switch 2117 to start the focus control. The microcomputer 2160 activates the sine wave generation circuit 2124. If the output from the comparator 2128 is high, the microcomputer 2160 stops the operation of the sine wave generation circuit 2124 and sets a predetermined number of rotations to the motor control circuit 2126. If the output from the comparator 2128 is low, the ramp generation circuit 2157 is reset and the terminal c and the terminal b of the switch 2117 are connected to perform the focusing again.

Figure 17:
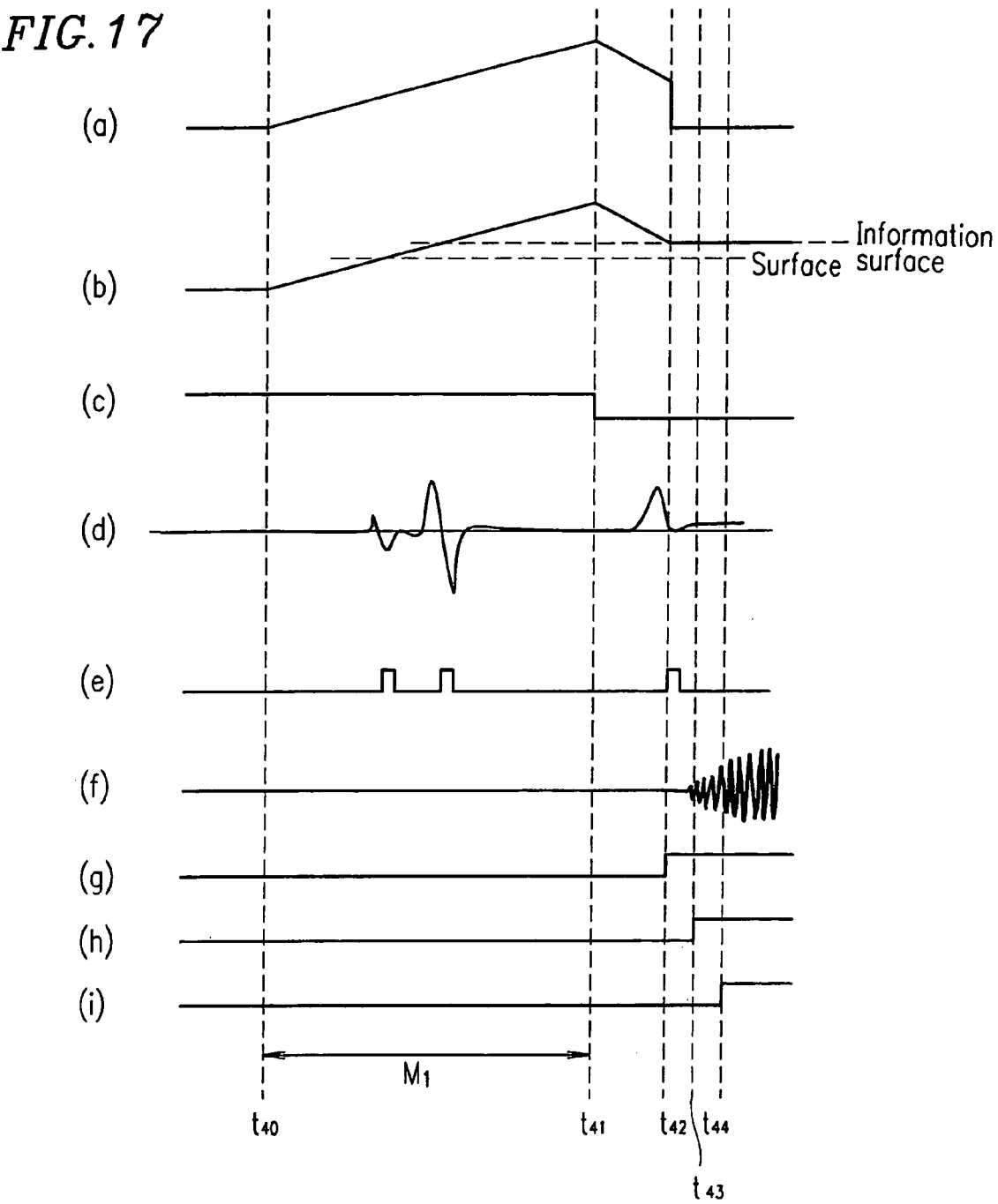
FIG. 17 shows waveforms of the signals used in the optical disc unit.

FIG. 17 shows waveforms of the signals used in the optical disc unit 2005. Waveform (a) represents the output from a ramp generation circuit 2157, waveform (b) represents a focal point, waveform (c) represents a signal at the terminal b of the ramp generation circuit 2157, waveform (d) represents the FE signal, waveform (e) represents the zero-cross signal, waveform (f) represents the TE signal, waveform (g) represents a signal at the control terminal d of the switch 2117, waveform (h) represents the output from the comparator 2128, and waveform (i) represents a signal corresponding to the predetermined number of rotations sent by the motor control circuit 2126 to the motor 2127.

After the microcomputer 2160 starts the operation of the ramp generation circuit 2157 at time $t_{40}$, a current corresponding thereto flows through the focusing coil. Thus, the objective lens 2103 gradually approaches the information surface of the optical disc 2100 and passes through the information surface. The microcomputer 2160 sets the potential of the terminal b of the ramp generation circuit 2157 low at time $t_{41}$, when a predetermined time period $M_1$ has lapsed after time $t_{40}$. Then, the output from the ramp generation circuit 2157 starts to decrease at a constant speed from time $t_{41}$. Accordingly, the focal point gradually approaches the information surface and matches the information surface at time $t_{42}$. The zero-cross signal is output.

The microcomputer 2160 makes the potential at the control terminal d of the switch 2117 high and connects the terminal c and the terminal a of the switch 2117 to perform focus control. The microcomputer 2160 activates the sine wave generation circuit 2124 at time $t_{43}$. If the focal point of the optical beam is on the information surface, the optical beam traverses the tracks and the TE signal is in the sine wave form. If amplification detection means, i.e., the amplification detection circuit 2121, detects that the amplification of the TE signal is a predetermined value or more, the output from the comparator 2128 becomes high. The microcomputer 2160 determines that the focusing to the information surface is normally ended and sets the predetermined number of rotations to the motor control circuit 2126 at time $t_{44}$.

According to the present embodiment, whether the focusing is normally ended is determined before the motor 2127 is rotated. Thus, the motor 2127 is not rotated when the focusing is not normally performed and thus in the case where the objective lens 2103 collided into the surface of the optical disc 2100. Therefore, the optical disc 2100 is free from being damaged in a wide range. Further, even if the reflectance of information surface is low as in the double-layer optical disc, it is possible to surely detect the information surface and to surely perform the focusing.

The rotation control of the motor 2127 described in the present embodiment can be applied to any of the above-described embodiments.

(Embodiment 6)

Figure 18:
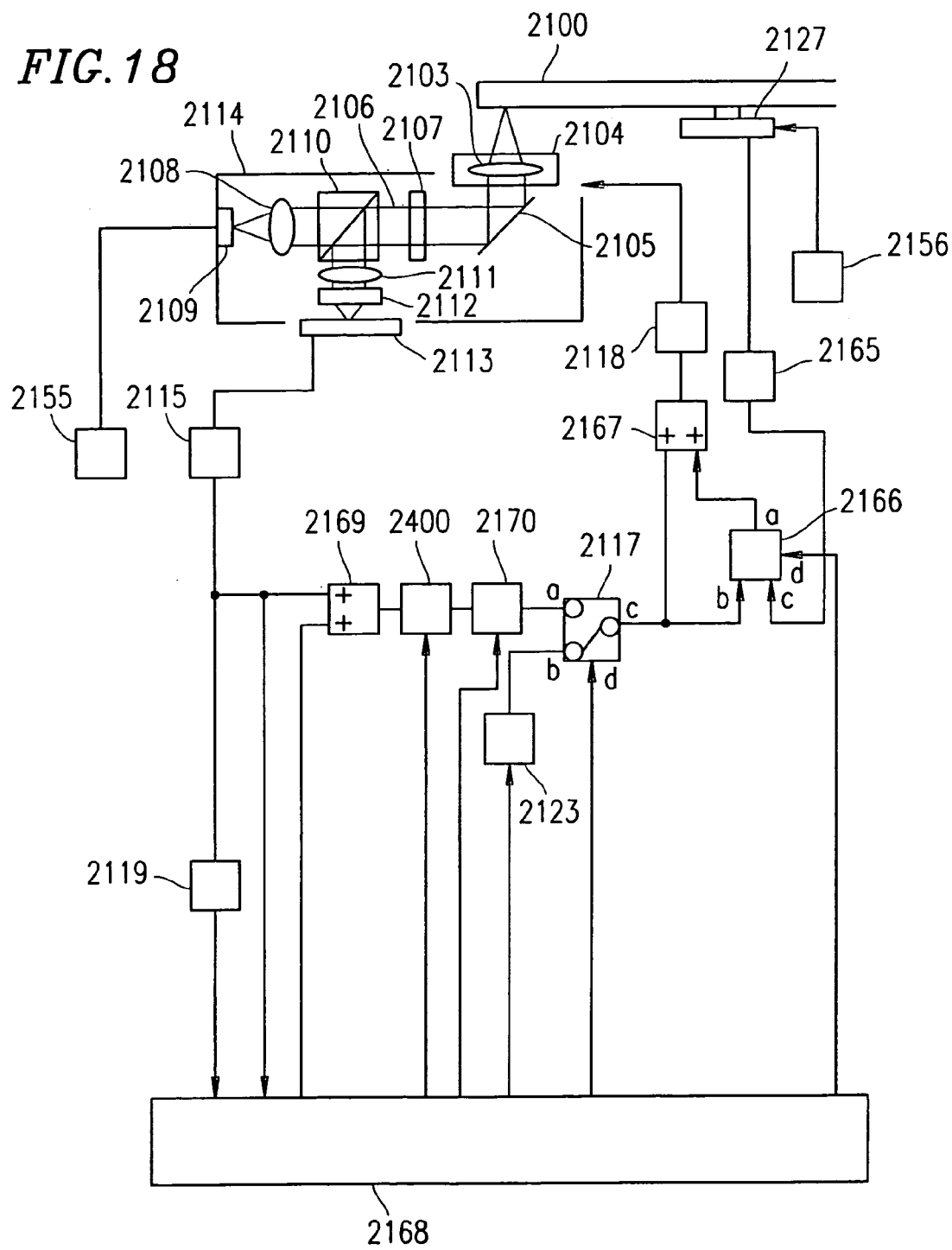
FIG. 18 shows an exemplary structure of an optical disc unit according to Embodiment 6 of the present invention.

FIG. 18 shows an exemplary structure of an optical disc unit 2006 according to Embodiment 6 of the present invention. Like blocks as in the above embodiments are indicated by like reference numerals, and the explanations thereof are omitted.

In the present embodiment, a single rotation memory 2166 acts as storage means for storing displacement in a focusing direction of the actuator 2104 which corresponds to a rotation angle of an optical disc 2100.

The motor control circuit 2156 controls the motor 2127 to rotate at a predetermined number of rotations. The laser control circuit 2155 controls the laser 2109 to emit light at a predetermined power. A rotation angle detection circuit 2165 detects and outputs a rotation angle of the motor 2127. Hereinafter, the signal is referred to as the rotation angle signal. The single rotation memory 2166 stores an input voltage of the power amplifier 2118 during a cycle of a single rotation of the optical disc 2100 in synchronization with the rotation angle signal. The stored value is output to an adder 2167 in synchronization with the rotation angle signal.

Such storage and output operations are controlled by a microcomputer 2168.

In the structure of the present embodiment, an open loop gain of a focus control system can be measured.

The microcomputer 2168 sends a sine wave to the adder 2167 with the terminal c and the terminal a of the switch 2117 being closed and the focus control is being performed. An objective lens 2103 is controlled so as to follow the sine wave added to the focus control system. The microcomputer 2168 captures the FE signal in this state and calculates the open loop gain of the focus control system based on the relationship between the added sine wave and amplification and a phase of the FE signal. Based on the calculated gain value, the gain of the amplifier 2400 is changed so that the open loop has a predetermined gain. The predetermined gain is a gain assumed when a phase lead characteristic of a phase compensation circuit 2170 which will be described later is designed.

The phase compensation circuit 2170 is a filter for causing the phase to lead for stabilizing the focus control system.

In this structure, a phase characteristic can be switched to lead in a wide band or a narrow band. The focusing is performed with the phase characteristic set to lead in the wide band. Then, after the open loop gain of the focus control system is adjusted, the phase characteristic of the band is set to lead in the narrow band. Specifically, a period between the time when the focusing starts and the time when the open loop gain of the focus control system is adjusted, the phase characteristic is set to lead in the wide band. Due to variance in reflectances of the optical disc 2100 and variance in sensitivities of the focus actuator, the open loop gain deviates from the predetermined gain. Thus, when the focusing is performed, the focus control is performed with the phase characteristic set to lead in the wide band, and after a gain adjustment, it is returned to the state where the phase leads in a normal band.

Therefore, the focusing becomes stable, and it is possible to set the open loop gain after the gain adjustment higher than the open loop gain at the focusing.

The phase compensation circuit 2170 is described with reference to FIGS. 19 and 20.

Figure 19:
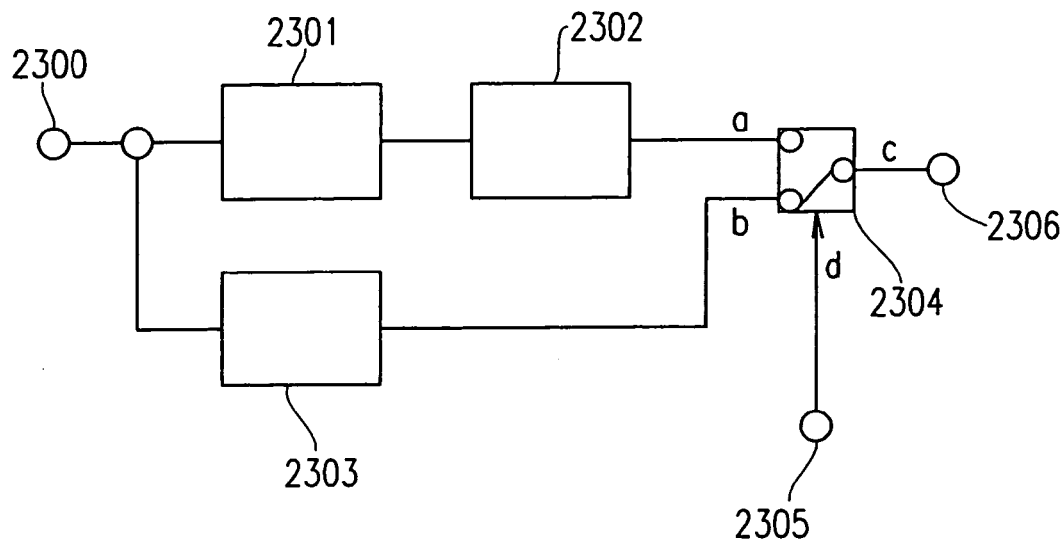
FIG. 19 is a block diagram showing an exemplary structure of a phase compensation circuit.

FIG. 19 shows an exemplary structure of the phase compensation circuit 2170. A first input terminal 2300 is connected to a first phase compensation circuit 2301 and a third phase compensation circuit 2303. The first phase compensation circuit 2301 and a second phase compensation circuit 2302 are connected in series. An output of the second phase compensation circuit 2302 is connected to a terminal a of a switch 2304. The third phase compensation circuit 2303 is connected in parallel with the first phase compensation circuit 2301 and the second phase compensation circuit 2302 connected in series. The output thereof is connected to a terminal b of the switch 2304. A terminal c of the switch 2304 is connected to an output terminal 2306. A signal from the output terminal 2306 is input to the single-rotation memory 2166 and the adder 2167. A terminal d of the switch 2304 is connected to a second input terminal 2305. The second input terminal 2305 is connected to the microcomputer 2168.

Figure 20:
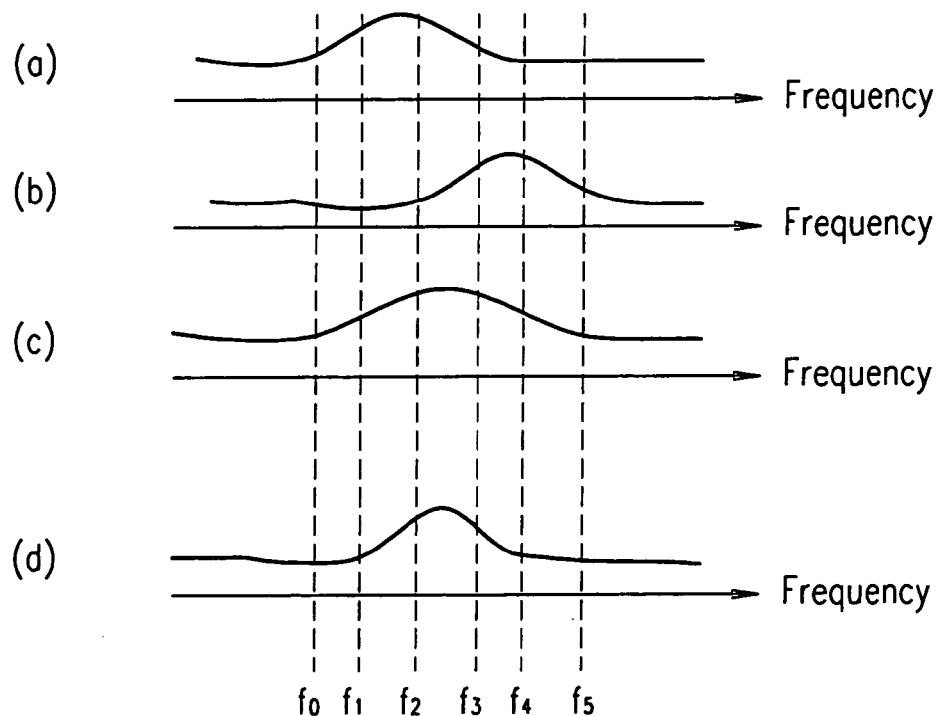
FIG. 20 shows phase characteristics of the circuits included in the phase compensation circuit.

FIG. 20 shows phase characteristics of the circuits included in the phase compensation circuit 2170. In FIG. 20, the horizontal axis indicates frequencies and vertical axis indicates phases. The frequencies indicated by the horizontal axis are scaled by logarithm.

(a) in FIG. 20 represents a phase characteristic of the first phase compensation circuit 2301. In the first phase compensation circuit 2301, the phase leads within the band between the frequencies $f_0$ and $f_3$.

(b) in FIG. 20 represents a phase characteristic of the second phase compensation circuit 2302. In the second phase compensation circuit 2302, the phase leads within the band between the frequencies $f_2$ and $f_5$.

(c) in FIG. 20 represents a phase characteristic of the first phase compensation circuit 2301 and the second phase compensation circuit 2302 connected in series. In this serial circuit, the phase leads within the band between the frequencies $f_0$ and $f_5$.

(d) in FIG. 20 represents a phase characteristic of the third phase compensation circuit 2303. In the third phase compensation circuit 2303, the phase leads within the band between the frequencies $f_1$ and $f_4$.

Thus, by switching the level of the second input terminal, the phase characteristic can be switched to lead in the wide band or in the narrow band.

The frequency at which the gain of the open loop becomes 0 dB is predetermined to be between $f_2$ and $f_3$. Thus, the phase characteristic of the first phase compensation circuit 2301 and the second phase compensation circuit 2302 connected in series is designed such that the phase leading becomes the maximum between frequencies $f_2$ and $f_3$. The phase characteristic of the third phase compensation circuit 2303 is also designed such that the phase leading becomes the maximum between frequencies $f_2$ and $f_3$. The phase compensation circuit of the serially connected first phase compensation circuit 2301 and the second phase compensation circuit 2302 has a wider band for the phase to lead compared to the third phase compensation circuit 2303. Thus, even if the open loop gain varies, a phase allowance can be secured, and thus the control system is stable. However, widening the band for phase to lead results in an increase in the gain of the phase compensation circuit 2170. Thus, an excessive amount of current flows through the coil of the actuator due to noise or the like. In order to prevent this excessive current, when the serially connected first phase compensation circuit 2301 and the second phase compensation circuit 2302 are used, it is preferable to reduce the open loop gain a little.

Figure 21:
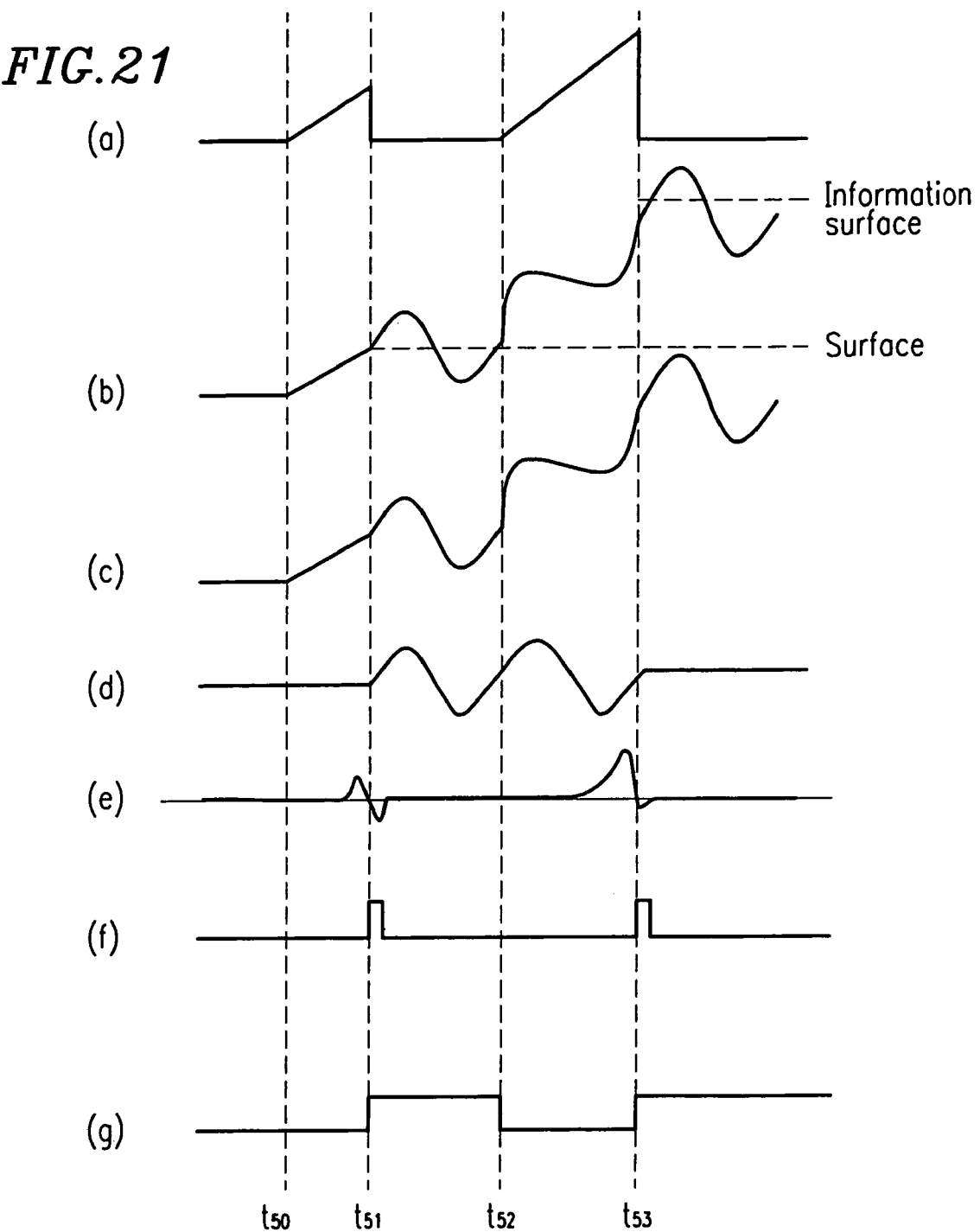
FIG. 21 shows waveforms when the focusing is being performed.

FIG. 21 shows waveforms when the focusing is performed. In FIG. 21, waveform (a) represents the output from a ramp generation circuit 2123, waveform (b) represents a focal point, waveform (c) represents an input waveform of the comparator 2128, waveform (d) represents an output waveform of the single-rotation memory 2166, waveform (e) represents the FE signal, waveform (f) represents a zero-cross signal, and waveform (g) represents a signal at the control terminal d of the switch 2117. The microcomputer 2168 makes the potential at the second input terminal 2305 of the switch 2304 high and connects the terminal a and the terminal c such that the output signal from the serially connected first phase compensation circuit 2301 and the second phase compensation circuit 2302 is transmitted to the output terminal 2306. Thus, the phase characteristic of the phase compensation circuit 2170 becomes the one having the wide band for the phase to lead.

The microcomputer 2168 makes the potential of the control terminal d of the switch 2117 low at time $t_{50}$ and connects the terminal c and the terminal b of the switch 2117. The ramp generation circuit 2123 generates a signal varying at a constant speed. A current corresponding to the output of the ramp generation circuit 2123 flows through the focusing coil by the power amplifier 2118. Accordingly, the objective lens 2103 moves toward the optical disc 2100 (in an upper direction in the figure). When the focal point matches the surface of the optical disc 2100, the first zero-cross signal is output. The microcomputer 2168 makes the potential at the control terminal d of the switch 2117 high at time $t_{51}$ when the first zero-cross signal is detected, and connects the terminal a and the terminal c of the switch 2117 to perform the focus control.

The focus control is performed such that the focal point of the optical beam locates on the surface of the optical disc 2100.

Since the optical disc 2100 wobbles, the objective lens 2103 moves up and down to follow the wobbles. Accordingly, the input level of the power amplification circuit 2118 before the single-rotation memory 2166 is activated is proportional to the wobbles.

The time period from time $t_{51}$ to $t_{52}$ is a cycle of a single rotation of the optical disc 2100. The microcomputer 2168 commands the single-rotation memory 2166 to operate storage at time $t_{51}$. The single-rotation memory 2166 stores the level at the terminal b of the switch 2117 from $t_{51}$ to $t_{52}$. Then, the single-rotation memory 2166 outputs the stored value to the adder 2167 at time $t_{52}$ and after. The microcomputer 2168 makes the potential at the control terminal d of the switch 2117 low at time $t_{52}$, thereby connecting the terminal c and the terminal b of the switch 2117. The microcomputer 2168 makes the potentials at the terminal a and the terminal b of the ramp generation circuit 2123 high, and sends a command for reactivating the ramp generation circuit 2123. Therefore, the output from the adder 2167 is a signal which is obtained by adding the output of the ramp generation circuit 2123 and the output of the single-rotation memory 2166. The objective lens 2103 gradually approaches the optical disc 2100 in response to the output from the adder 2167.

When the focal point matches the information surface at time $t_{53}$, the zero-cross signal is output. The microcomputer 2168 stops the output from the single-rotation memory 2166, makes the potential at the control terminal d of the switch 2117 high, and connects the terminal c and the terminal a of the switch 2117. Thus, the focus control is performed such that the focal point is on the information surface.

The microcomputer 2168 performs a gain adjustment, and the gain of the amplifier 2400 is changed such that the open loop gain of the focus control becomes the predetermined value.

The microcomputer 2168 makes the potential at the second input terminal 2305 of the switch 2304 low and connects the terminal b and the terminal c of the switch 2304 such that the output signal of the third phase compensation circuit 2303 is output. Thus, the phase characteristic of the phase compensation circuit 2170 is switched to lead in the narrow band.

According to the present embodiment, even if the optical disc 2100 has wobbles larger than the working distance, the objective lens 2103 and the optical disc 2100 do not collide.

FIG. 22 illustrates the working distance. The working distance is the shortest distance K between the surface of the optical disc 2100 and the upper surface of the objective lens 2103 when the focal point is on the information surface.

According to the present embodiment, the relative speed of the objective lens 2103 and the information surface of the optical disc 2100 is reduced to substantially zero. Thus, the focusing is stabilized.

As factors of variance in the open loop gain, variances in reflectance of the information surface of the optical disc 2100 and in the sensitivity of the focus actuator are described. In the case of a doublelayer optical disc, the amplification of the FE signal normalized by reflectance amount changes due to the light reflected off another information surface and thus the open loop gain varies. According to the present embodiment, the open loop gain is adjusted. Thus, even if the reflectance of information surface is low as in the doublelayer optical disc, it is possible to surely detect the information surface and to surely perform the focusing.

(Embodiment 7)

Figure 23:
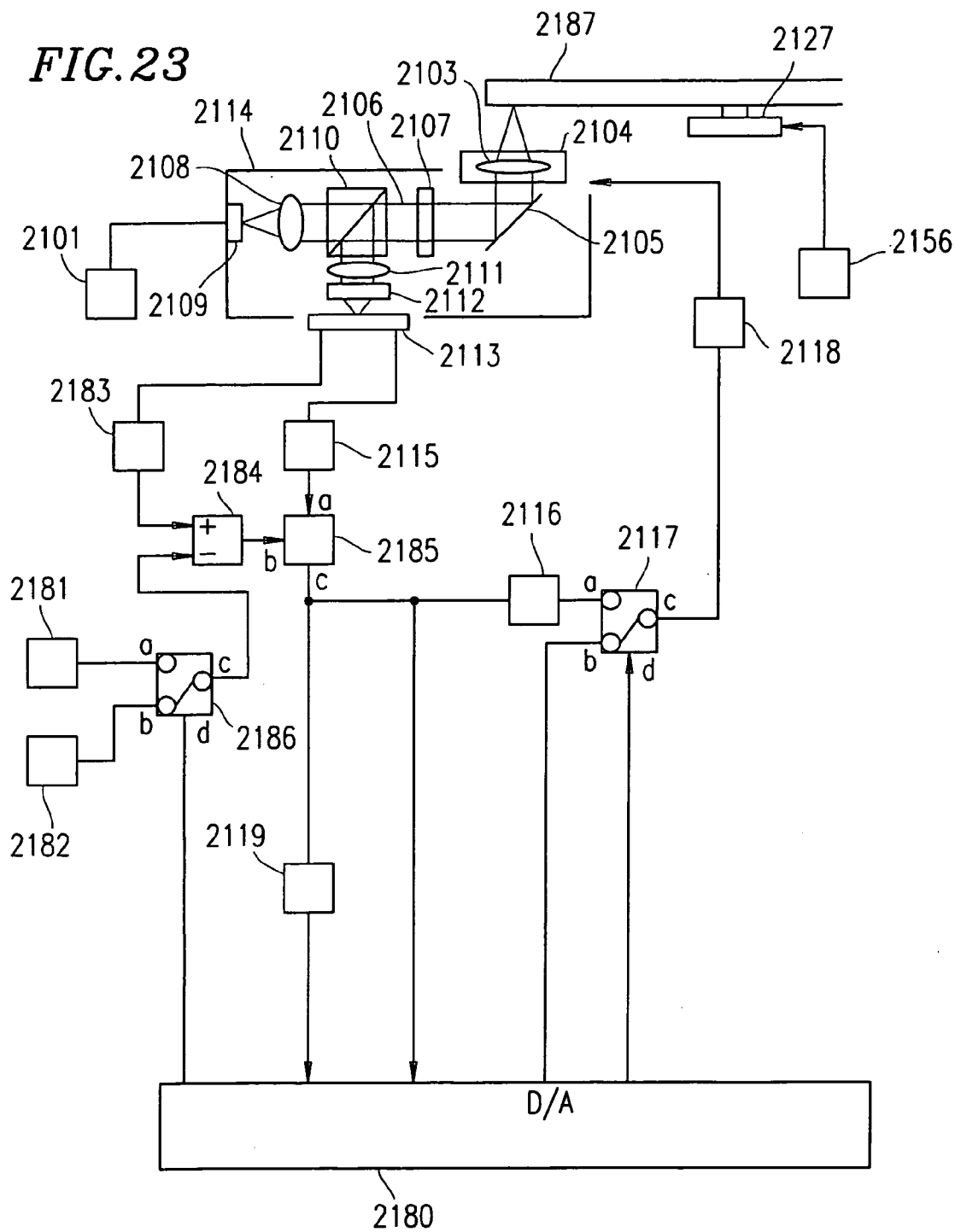
FIG. 23 is a block diagram showing an exemplary structure of an optical disc unit according to Embodiment 7 of the present invention.

FIG. 23 shows an exemplary structure of an optical disc unit 2007 according to Embodiment 7 of the present invention. Like blocks as in the above embodiments are indicated by like reference numerals, and the explanations thereof are omitted.

In the present embodiment, a photodetector 2113 acts as a photodetection means for detecting the light reflected off an optical disc 2187 having a plurality of information surfaces, after the optical beam is focused and applied to a predetermined information surface of the optical disc 2187.

The FE signal generation circuit 2115 acts as focus error detection means for detecting a misalignment between the focal point of the optical beam and the predetermined information surface of the optical disc 2187 based on an output from the photodetector 2113.

A total internal reflection amount signal generation circuit 2183 acts as total internal reflection amount detection means for detecting a total internal reflection amount from the optical disc 2187 based on the output from the photodetector 2113.

A divider 2185 acts as normalization means for dividing the output of the focus error detection means by a value obtained by subtracting a signal value corresponding to the reflection amount of the light reflected off the information surfaces other than the predetermined information surface of the optical disc from the output of the total internal reflection amount detection means.

The optical disc 2187 is a doublelayer optical disc having two information surfaces, i.e., a first information surface and a second information surface, on one side. The motor control circuit 2156 controls the motor 2127 to rotate at a predetermined number of rotations. The laser control circuit 2155 controls the laser 2109 so as to emit light at a predetermined power. The light reflected off the optical disc 2187 incident on the photodetector 2113 and is sent to the focus error signal generation circuit 2115, and the total internal reflectance amount signal generation circuit 2183. The total internal reflectance amount signal generation circuit 2183 detects and outputs the total internal reflectance reflected off the optical disc 2187 and incidents on the photodetector 2113. Hereinafter, the output from total internal reflectance amount signal generation circuit 2183 is referred to as total internal reflectance amount signal.

The total internal reflectance amount signal is sent to the terminal b of the divider 2185 via a subtractor 2184. An FE signal is input to the terminal a of the divider 2185. The divider 2185 divides the signal input to the terminal a by the signal input to the terminal b and then outputs from the terminal c. The divider 2185 maintains the constant level of the FE signal without the amplification level of the FE signal being affected by the changes in the reflectances of the information surfaces of the optical disc 2187. Hereinafter, the output of the divider 2185 is referred to as the normalization FE signal. The output of the divider 2185 is sent to the power amplifier 2118 via the phase compensation circuit 2116 and the switch 2117.

Thus, even when the reflectance of the information surface of the optical disc 2187 is changed, the gain of the open loop does not change. However, in the doublelayer optical disc, light reflected off the information surfaces other than the information surface on which the focal point locates incidents on the photodetector 2113. Thus, even though the FE signal is normalized with the total internal reflectance, the level of the FE signal lowers. The subtractor 2184 compensates for the amount of the light reflected off other information surfaces. A switch 2186 is connected to the subtractor 2184. A first reference voltage 2181 and a second reference voltage 2182 are connected to the switch 2186. The switch 2186 outputs a signal of either of them by a command from the microcomputer 2180.

The first reference voltage 2181 corresponds to an amount of light reflected off the second information surface in the case where the focal point is on the first information surface. The second reference voltage 2182 corresponds to an amount of light reflected off the first information surface in the case where the focal point is on the second information surface. Accordingly, the subtractor 2185 outputs a signal representing the reflectance amount of the first information surface or second information surface from which the amount of light reflected off the other information surface is removed.

The level of the first reference voltage 2181 and the second reference voltage 2182 depends on the characteristic of the optical head 2114, reflectance of the optical disc 2187, and the like. When the focal point of the optical beam is shifted from the information surface to the second information surface, the microcomputer 2180 makes the control terminal d of the switch 2117 low and connects the terminal c and the terminal b of the switch 2117.

The microcomputer 2180 sends a drive voltage of the focusing coil for moving the focal point of the optical beam from the first information surface to the second information surface via a D/A converter. After the focal point is shifted, the control terminal d of the switch 2117 is changed to be high again. The terminal c and the terminal a are connected to operate the focus control. As described above, the switch 2186 is switched depending on whether the focal point of the optical beam is on the first information surface or on the second information surface. Thus, it is possible to change a signal value corresponding to the amount of light reflected off the information surfaces other than the information surface of the optical disc 2187 on which the focal point of the optical beam locates, which is input to the normalization means, i.e., the subtractor 2185, in accordance with the information surface (i.e., the signal value which is input to the terminal b of the subtractor 2185).

Figure 24:
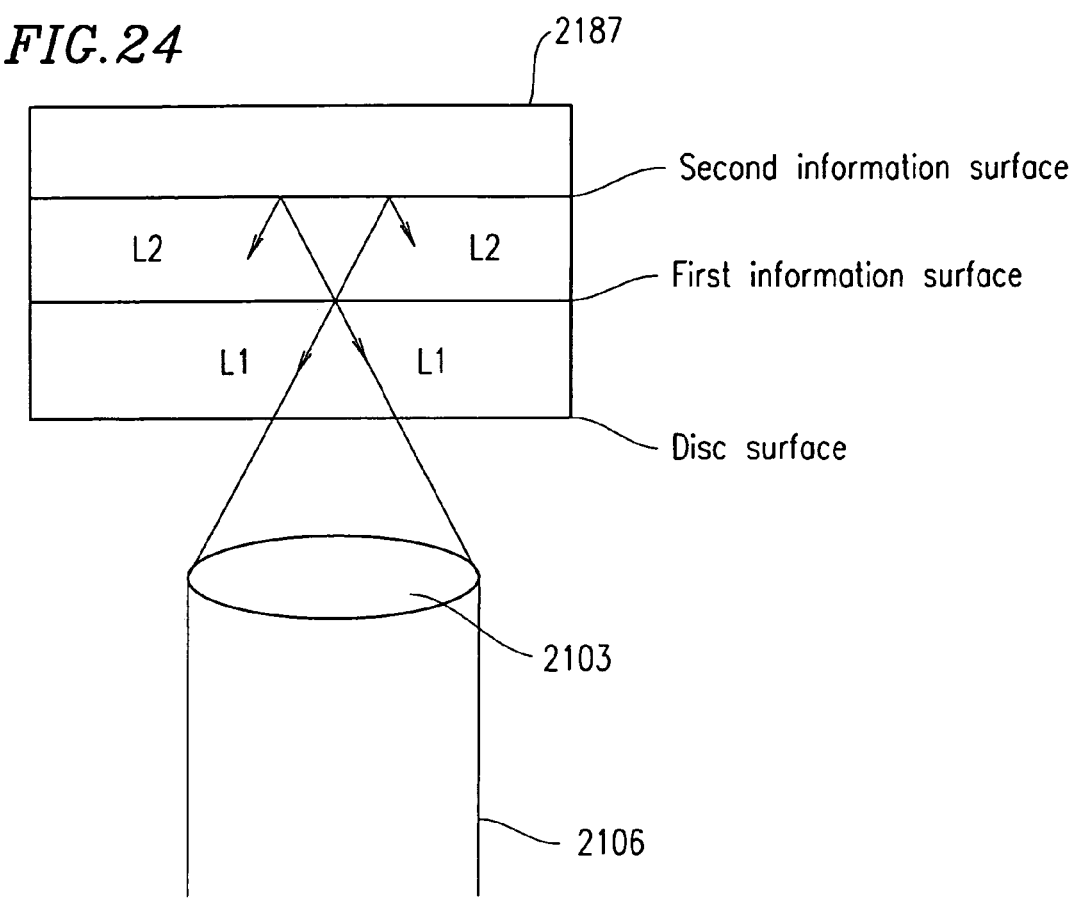
FIG. 24 illustrates a doublelayer optical disc 2187 and an optical beam 2106.

FIG. 24 illustrates the doublelayer optical disc 2187 and the optical beam 2106. In the example shown in FIG. 24, the focal point is on the first information surface. In the case of reproducing the information recorded on the first information surface, the focus control is performed such that the focal point is on the first information surface. In the case of reproducing information recorded on the second information surface, the focus control is stopped, the objective lens 2103 is brought closer to the optical disc 2187, and after the focal point is shifted to the second information surface, the focus control is performed again.

In the case where the focal point is on the first information surface, the optical beam L1 is reflected off the first information surface and incidents on the photodetector 2113. The FE signal is generated by the optical beam L1.

However, a portion of the optical beam L2 transmitted through the first information surface and reflected off the second information surface incidents on the photodetector 2113. The reflected light does not affect the FE signal but increases the total internal reflection amount signal. Thus, when the FE signal is normalized with the total internal reflection amount signal, the level of the FE signal is decreased by the amount of the optical beam L2. The amounts of the light reflected off the other information surface are different in the case where the focal point is on the first information surface and in the case where the focal point is on the second information surface.

Next, the operation for moving the focal point from the first information surface to the second information surface is described.

Figure 25:
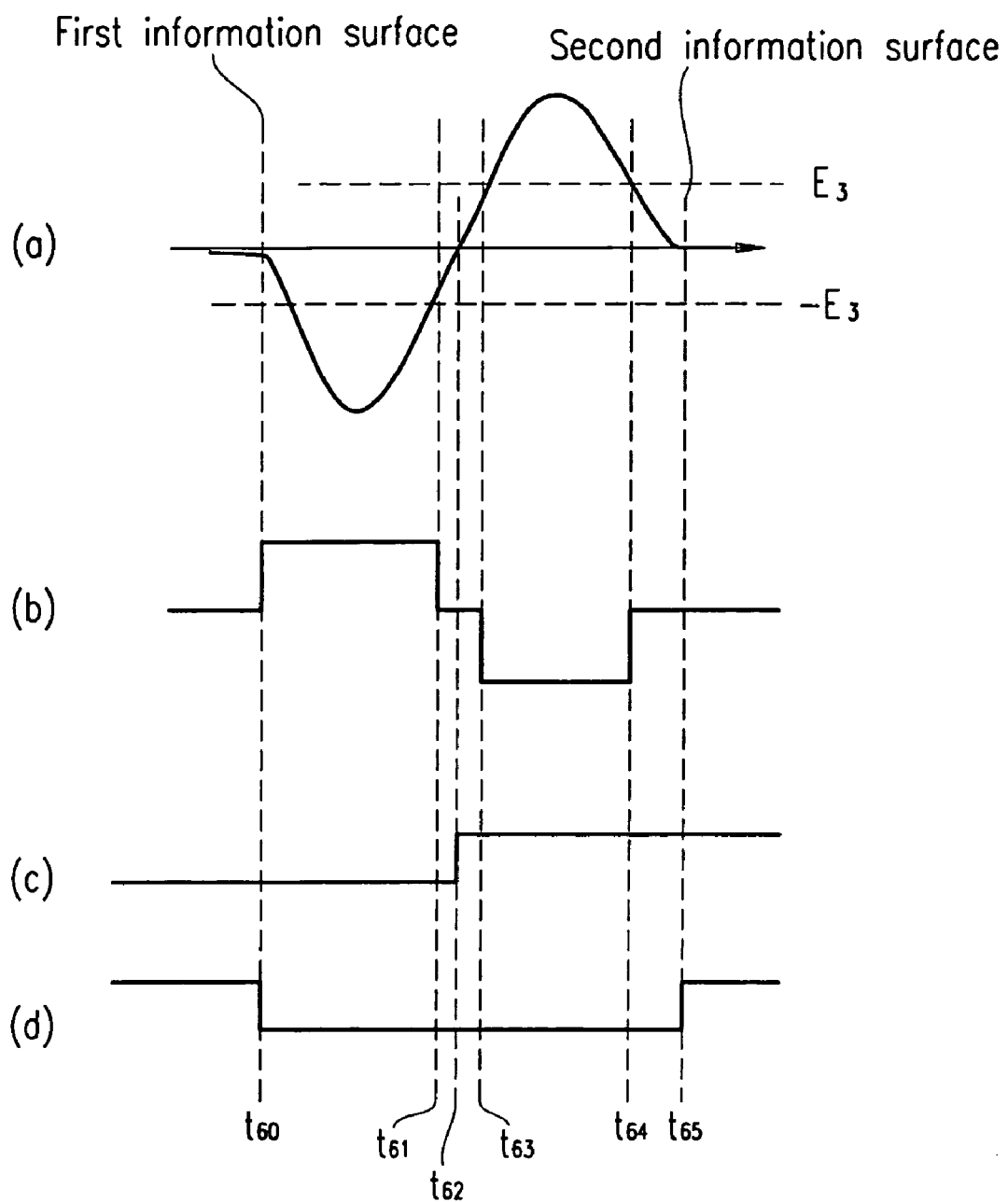
FIG. 25 shows waveforms of the signals used in the optical disc unit.

FIG. 25 shows waveforms of the signals used in the optical disc unit 2007. Waveform (a) represents the FE signal after normalization, waveform (b) represents an output waveform of D/A converter of the microcomputer 2180, waveform (c) represents a waveform from the terminal d of the switch 2186, and waveform (d) represents a signal output to the terminal d of the switch 2117. The microcomputer 2180 outputs an acceleration pulse for moving the focal point to the second information surface from time $t_{60}$ via the D/A converter. Thus, the objective lens 2103 moves toward the second information surface and the focal point also shifts toward the second information surface. The microcomputer 2180 detects that the level of the normalized FE signal becomes $-E_3$ at time $t_{61}$ and stops the acceleration pulse. When the normalized FE signal crosses zero at time $t_{62}$, the terminal c of the switch 2186 is switched from the terminal a to the terminal b and connected thereto. When the level of the normalized FE signal is $E_3$ at time $t_{63}$, the decelerate pulse is output. The decelerate pulse is output during the period in which the level of the normalized FE signal is $E_3$ or higher, i.e., until time $t_{64}$.

The microcomputer 2180 connects the terminal c and the terminal a of the switch 2117 when the normalized FE signal crosses zero at time $t_{65}$ and the focus control is performed again. The time when the accelerate pulse and the decelerate pulse are output is controlled based on the FE signal normalized with the total internal reflection amount signal from which the amount of light reflected off the other information surfaces is removed. Therefore, it is possible to detect the timing accurately and the focal point can shift between the information surfaces stably.

(Embodiment 8)

Figure 26:
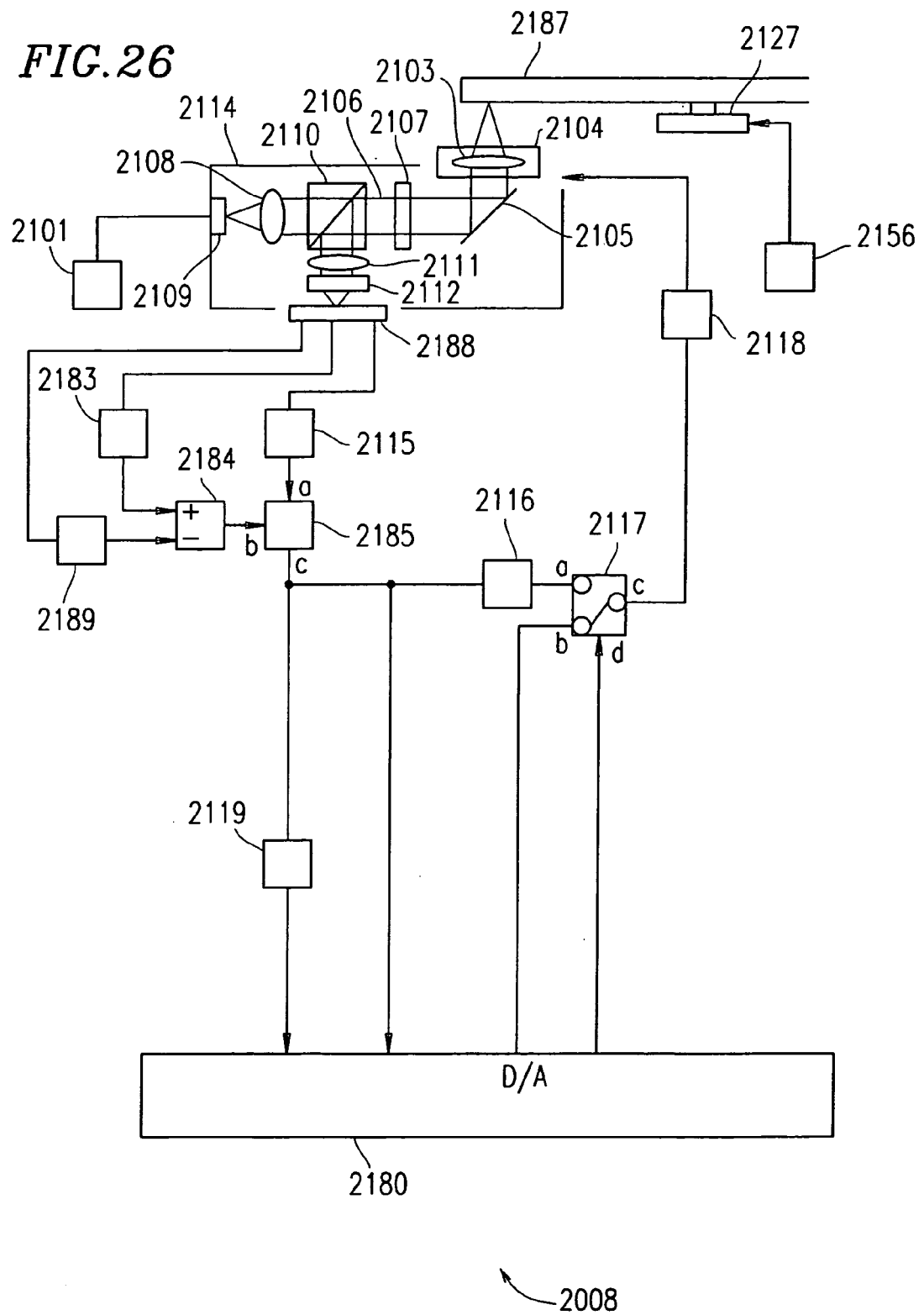
FIG. 26 is a block diagram showing an exemplary structure of an optical disc unit according to Embodiment 8 of the present invention.

FIG. 26 shows an exemplary structure of an optical disc unit 2008 according to Embodiment 8 of the present invention. Like blocks as in the above embodiments are indicated by like reference numerals, and the explanations thereof are omitted.

A photodetector 2188 has five light-receiving sections. With respect to Embodiment 2, the photodetector 2113 provided with 4 light-receiving sections is described. In the present embodiment, a light-receiving section surrounding the outside of the 4 light-receiving sections is further provided and acts as stray light detection means for detecting light reflected off information surfaces other than the predetermined information surface of the optical disc.

In the present embodiment, the photodetector 2188 is composed of the 4 light-receiving sections which form the photodetector 2113 described with reference to Embodiment 2, and the stray light detection means, i.e., the light receiving section provided so as to surround the outside of the 4 light-receiving sections. The total light amount of the light receiving sections located inside the light-receiving section which is the stray light detection means is a total internal reflection amount signal. This is the amount of the light received in the part corresponding to the photodetector 2113 described in Embodiment 2.

As described with reference to FIG. 24, light reflected off the second surface in the case where the focal point is on the first information surface incidents on the entire photodetector 2188. Most of the light reflected off the first information surface incidents on the inner light-receiving sections. Accordingly, the light reflected off the second information surface incident on the inner light-receiving section is proportional to the light amount incident on the outer light-receiving section.

The value obtained by multiplying the light amount of the outer light-receiving section by a predetermined coefficient K is subtracted from the total internal reflection amount signal by the subtractor 2184. Thus, the total internal reflection amount signal without an effect of light reflected off other information surfaces is obtained.

Figure 27:
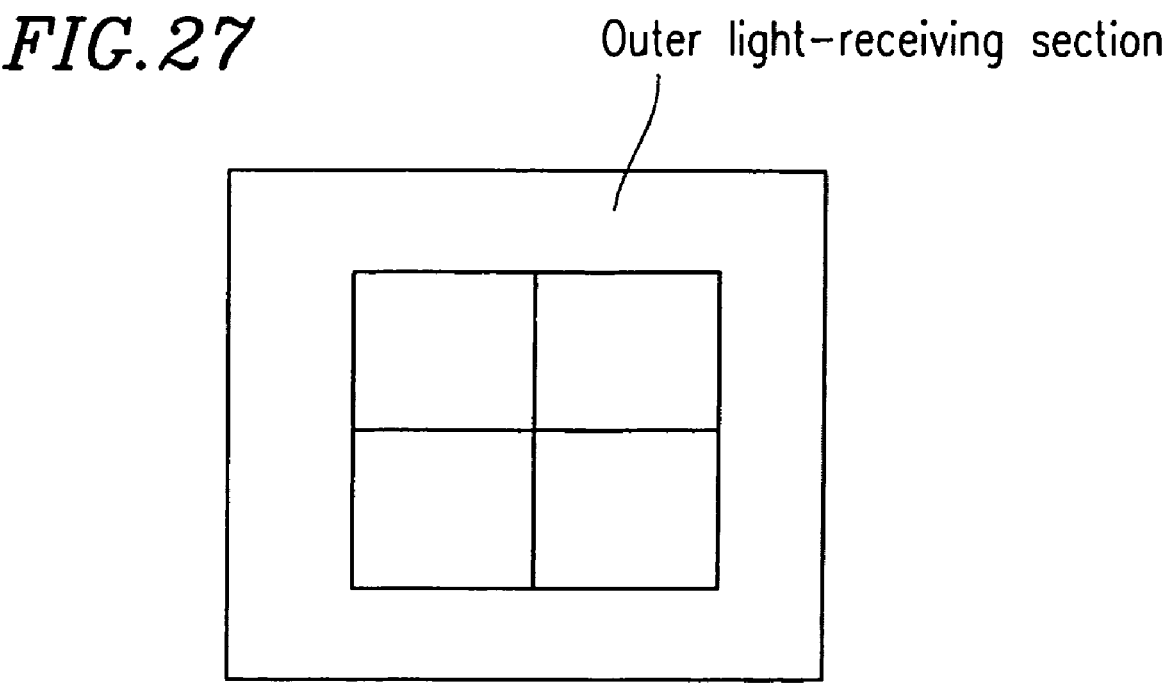
FIG. 27 schematically shows a structure of a photodetector.

FIG. 27 schematically shows the structure of the photodetector 2188. The inner 4 light receiving sections correspond to the photodetector 2113. The outer light-receiving section is the added portion. The operation of shifting the focal point from the first surface to the second surface is similar to that of Embodiment 7, and thus the explanation is omitted.

(Embodiment 9)

Figure 28:
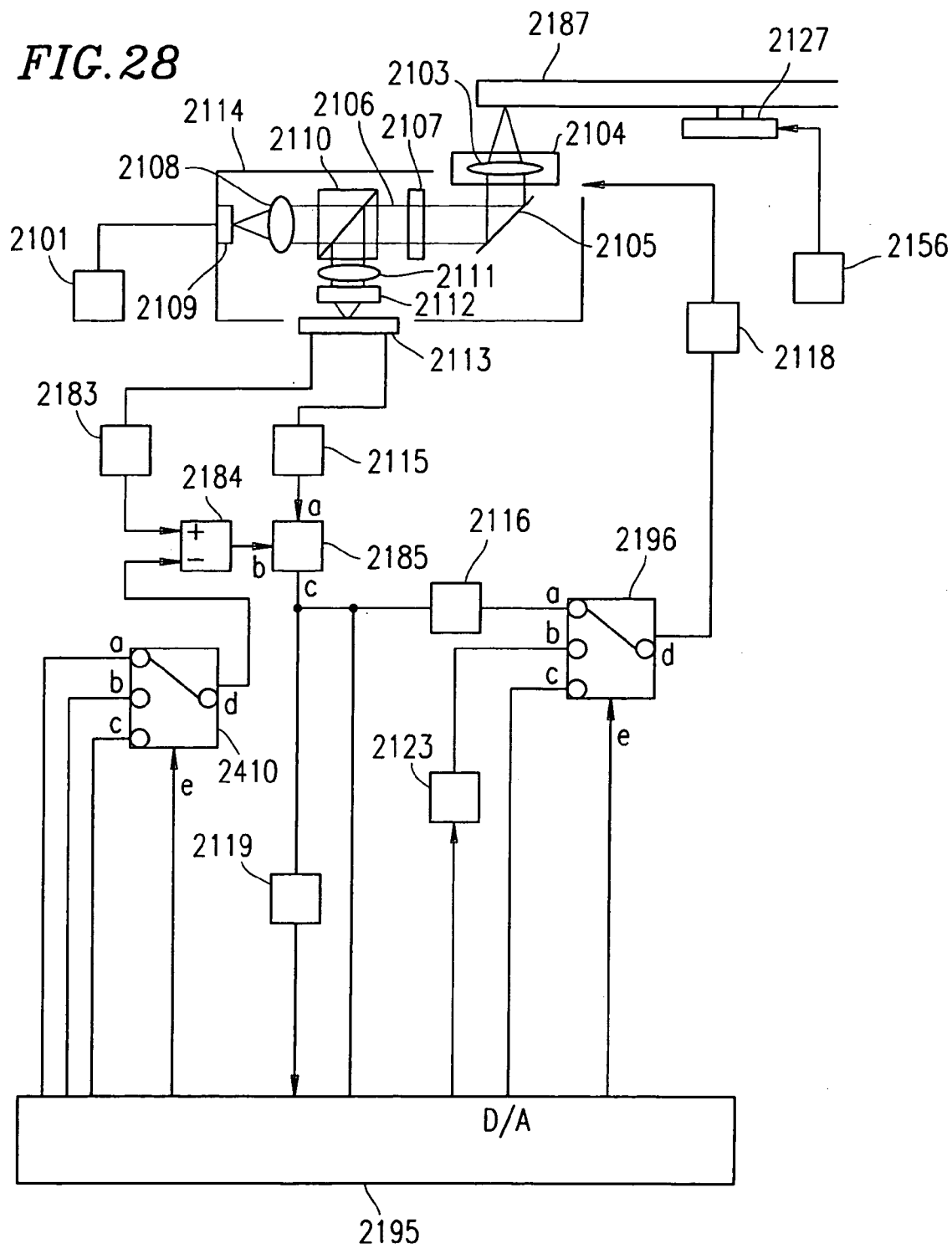
FIG. 28 is a block diagram showing an exemplary structure of an optical disc unit according to Embodiment 9 of the present invention.

FIG. 28 shows an exemplary structure of an optical disc unit 2009 according to Embodiment 9 of the present invention. Like blocks as in the above embodiments are indicated by like reference numerals, and the explanations thereof are omitted.

The optical disc 2187 is a doublelayer optical disc having two information surfaces on one side. The motor control circuit 2156 controls the motor 2127 so as to rotate with a predetermined number of rotations. The laser control circuit 2155 controls the laser 2109 so as to emit light at a predetermined power.

The operation for detecting light reflected off other information surfaces is described. A microcomputer 2195 changes level a the control terminal e of a switch 2196 to connect a terminal d and a terminal b. Also, the microcomputer 2195 changes the level at a control terminal e of a switch 2410 to connect a terminal d and a terminal c. The terminal c of the switch 2410 is set to zero level. The microcomputer 2195 activates the ramp generation circuit 2123. The output from the ramp generation circuit 2123 is sent to the power amplifier 2118 via the switch 2196. Thus, the objective lens 2103 approaches the optical disc 2187. An s-shape waveform is first output at the surface of the optical disc 2187. Next, an s-shape waveform is output at the first information surface. Then, an s-shape waveform is output at the second information surface.

The microcomputer 2195 measures amplification $H_1$ of the s-shape waveform at the first information surface and amplification $H_2$ of the s-shape waveform at the second information surface. The microcomputer 2195 prestores amplification $H_S$ of an s-shape waveform at a single-layer optical disc and the level of a total internal reflection amount signal $C_S$ in the case where the focal point is on the information surface. The microcomputer 2195 sets $Q_1$ obtained from formula (2) to the terminal a of the switch 2410 as light reflected off other information surfaces, at the first information surface. $Q_2$ obtained from formula (3) is set to the terminal b of the switch 2410 as light reflected off other information surfaces, at the second information surface.

$$Q_1 = C_S \cdot (1 - (H_1/H_S)) \quad (2)$$

$$Q_2 = C_S \cdot (1 - (H_2/H_S)) \quad (3)$$

After $Q_1$ and $Q_2$ are obtained, the focusing is performed again. Specifically, the microcomputer 2195 changes the level at the control terminal e of the switch 2196 to connect terminal d and terminal b. Also, the microcomputer 2195 changes the level at the control terminal e of the switch 2410 to connect the terminal d and the terminal a. The microcomputer 2195 activates the ramp generation circuit 2123. The output from the ramp generation circuit 2123 is sent to the power amplifier 2118 via the switch 2196. Thus, the objective lens 2103 approaches the optical disc 2187. When the microcomputer 2195 detects the first information surface, it changes the level of the control terminal e of the switch 2196 and connects the terminal d and terminal a to start the focus control operation. In the case where the focal point is shifted to the second information surface, the microcomputer 2195 changes the level at the control terminal e of the switch 2196 to connect the terminal d and the terminal c, and outputs an acceleration pulse to the terminal c of the switch 2196 via the D/A converter. Also, the microcomputer 2195 changes the level at the control terminal e of the switch 2410 to connect the terminal d and terminal b. The microcomputer 2195 changes the level at the control terminal e of the switch 2196 to connect the terminal d and terminal a again to start the focus control operation. In other words, in the case where the focal point of the optical beam is shifted, the switch 2410 is switched in accordance to the information surfaces. When the focal point is on the first information surface, the terminal a and the terminal d are connected, and when the focal point is on the second information surface, the terminal b and the terminal d are connected.

Figure 29:
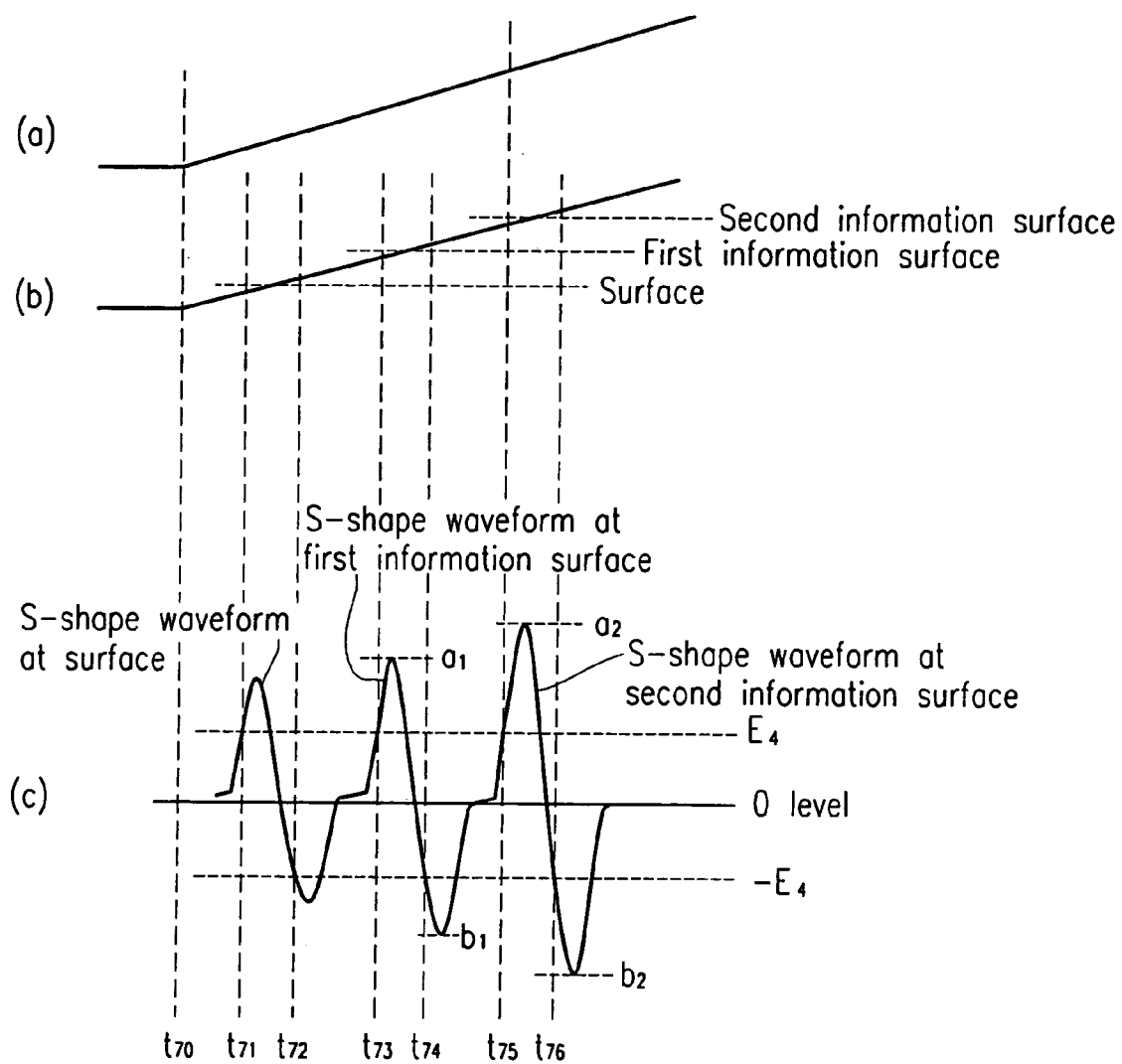
FIG. 29 shows waveforms of the signals used in the optical disc unit.

FIG. 29 shows waveforms of the signals used in the optical disc unit 2009. In FIG. 29, waveform (a) represents an output of the ramp generation circuit 2123, waveform (b) represents the focal point, and waveform (c) represents the normalized FE signal which is the output of subtractor 2185. The microcomputer 2195 activates the ramp generation circuit 2123 at time $t_{70}$. Thus, the focal point approaches the optical disc 2187, and the level of the normalized FE signal at the surface exceeds $E_4$ at time $t_{71}$. Further, the focal point of the optical beam approaches the optical disc 2187, and the level of the normalized FE signal becomes lower than $-E_4$ at time $t_{72}$.

The microcomputer 2195 detects that the focal point of the optical beam passes through the surface of the optical disc 2187. As the objective lens 2103 is further raised, the level of the normalized FE signal at the first information surface exceeds $E_4$ at time $t_{73}$. The microcomputer 2195 measures and stores the maximum value $a_1$ of the normalized FE signal during the period until the level of the normalized FE signal becomes $E_4$ again. At time $t_{74}$, the level of the normalized FE signal becomes lower than $-E_4$. The microcomputer 2195 measures and stores the level of the minimum value $b_1$ of the normalized FE signal during the period in which the level of the normalized FE signal becomes $-E_4$ again. $b_1$ is a negative value. The value obtained by subtracting $b_1$ from $a_1$ is amplification $H_1$ of the s-shape waveform at the first information surface. As the objective lens 2103 is further raised, the focal point of the optical beam further approaches the optical disc 2187. At time $t_{75}$, the level of the normalized FE signal exceeds $E_4$. The microcomputer 2195 measures and stores the maximum value $a_2$ of the normalized FE signal during the period until the level of the normalized FE signal becomes $E_4$ again. At time $t_{76}$, the level of the normalized FE signal becomes lower than $-E_4$. The microcomputer 2195 measures and stores the level of the minimum value $b_2$ of the normalized FE signal during the period until the level of the normalized FE signal becomes $-E_4$ again. The value obtained by subtracting $b_2$ from $a_2$ is amplification $H_2$ of the s-shape waveform at the second information surface.

The microcomputer 2195 calculates $Q_1$ and $Q_2$ using the above two formulas. In Embodiment 9, the light amount reflected off the other information surfaces is detected with the amplification of the normalized FE signal when the focal point passes through the information surface. However, when the amplification of the normalized FE signal decreases, the open loop gain of the focus control system decreases proportionally. The focus gain measurement means (not shown) may be used to measure the open loop gain of the focus control system, and based on a ratio of the measured gain and the gain for the single-layer optical disc, values of the terminal a and the terminal b of the switch 2410 may be set.

(Embodiment 10)

Figure 30:
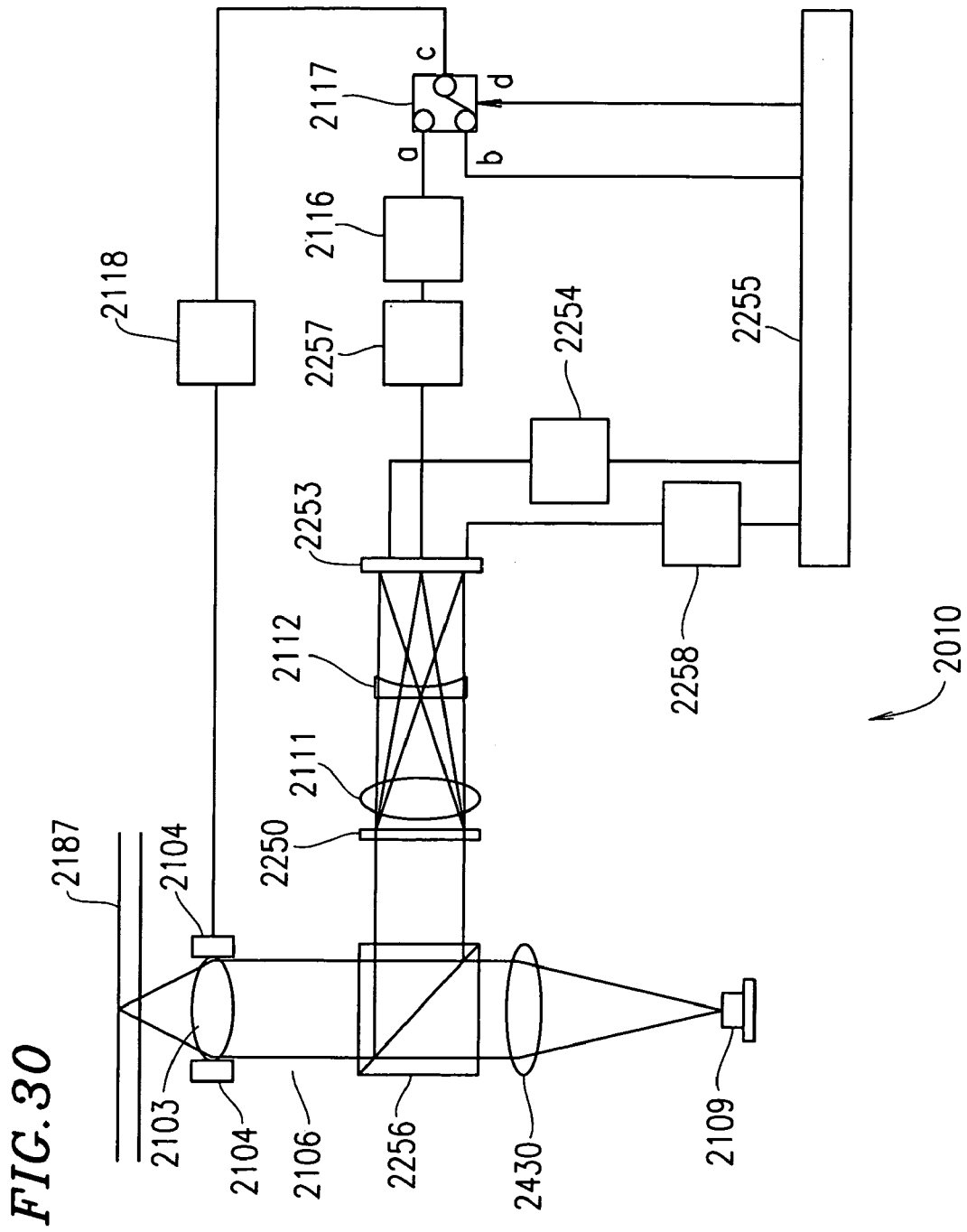
FIG. 30 is a block diagram showing an exemplary structure of an optical disc unit according to Embodiment 10 of the present invention.

FIG. 30 shows an exemplary structure of an optical disc unit 2010 according to Embodiment 10 of the present invention. Like blocks as in the above embodiments are indicated by like reference numerals, and the explanations thereof are omitted.

In the present embodiment, a hologram element 2250 acts as optical beam splitting means for splitting light which is reflected off the optical disc 2187, after the optical beam is focused and applied to a predetermined information surface of the optical disc 2187, into light of an inner region close to an optical axis and light of an outer region far from the optical axis.

An inner FE signal generation circuit 2258 acts as inner focus error detection means for detecting a misalignment between the focal point of the optical beam and the predetermined information surface of the optical disc 2187 based on the light of the inner region. An outer FE signal generation circuit 2254 acts as outer focus error detection means for detecting a misalignment between the focal point of the optical beam and the predetermined information surface of the optical disc based on the light of the outer region.

The optical disc 2187 is a doublelayer disc having two information surfaces on one side. The optical disc 2187 rotates at a predetermined number of rotations. The laser 2109 emits light at a predetermined power.

The light emitted from the laser 2109 becomes parallel light by a collimate lens 2430 and transmits through a beam splitter 2256.

The transmitted optical beam 2106 is condensed on the optical disc 2187 by the objective lens 2103 as condensing means. The condensed optical beam is reflected/diffracted by the tracks on the optical disc 2187.

The reflected/diffracted optical beam transmits the objective lens 2103 again and is reflected off the beam splitter 2256.

The reflected optical beam 2106 is separated into diffraction light and 0th order light by the hologram element 2250 as the optical beam splitting means. The 0th order light passes through the hologram element 2250 is condensed by the detection lens 2111, is given astigmatism of 45° relative to the tracks by the cylindrical lens 2112, and enters a photodetector 2253.

The photodetector 2253 receives the light and outputs a signal. The signal is input to a controlling FE signal generation circuit 2257. The controlling FE signal generation circuit 2257 generates a controlling FE signal.

The controlling FE signal is sent to the power amplifier 2118 via the phase compensation circuit 2116 and the switch 2117. Thus, a current flows through the focusing coil in accordance with the controlling FE signal.

+1st order light and −1st order light diffracted with the hologram element 2250 is condensed by the detection lens 2111, is given astigmatism of 45° relative to the tracks by the cylindrical lens 2112, and enters the photodetector 2253.

The photodetector 2253 receives the light, the optical beam reflected off the optical disc, divides it into the optical beam light of the inner region closer to the optical axis and the optical beam light of the outer region far from the optical axis, and outputs signals. The signals are respectively sent to the inner and outer FE signal generation circuits 2258 and 2254.

In the doublelayer optical disc, each of the first and second information layers has a protective layer of different thickness. Thus, spherical aberration is generated. The optical head is designed such that the spherical aberration is zero when the thickness of the protective layer is that between the thicknesses of the protective layers of the first and the second information surfaces. Thus, in the first information surface, the thickness of the protective layer is thin, and in the second information surface, the thickness of the protective layer is thick. Accordingly, the spherical aberrations at the first and the second information surfaces have reversed polarities.

Due to the spherical aberration, in the case where the focal point is on the first information surface (i.e., in the case where the level of the controlling FE signal is 0 at the first information surface), the level of the inner FE signal becomes positive and the level of the outer FE signal becomes negative.

In the case where the focal point is on the second information surface (i.e., in the case where the level of the controlling FE signal is 0 at the second information surface), the level of the inner FE signal becomes negative and the level of the outer FE signal becomes positive.

When the focal point of the optical beam is shifted from the first information surface to the second information surface, the terminal c and the terminal b of the switch 2117 are connected.

The microcomputer 2255 sends a drive voltage of the focusing coil for shifting the focal point of the optical beam from the first information surface to the second information surface to the terminal b of the switch 2117 via the D/A converter. The focal point of the optical beam starts to shift toward the second information surface. The microcomputer 2255 stops an acceleration pulse when the outer FE signal crosses zero and outputs a deceleration pulse.

When the focal point of the optical beam is shifted from the first information surface to the second information surface, the outer FE signal first crosses zero near the second information surface, and then the controlling FE signal crosses zero. Then, when the outer FE signal crosses zero again, the microcomputer 2255 stops the deceleration pulse.

Then, when the controlling FE signal crosses zero, the terminal c and the terminal a of the switch 2117 are connected. The focus control is performed again.

Figure 31:
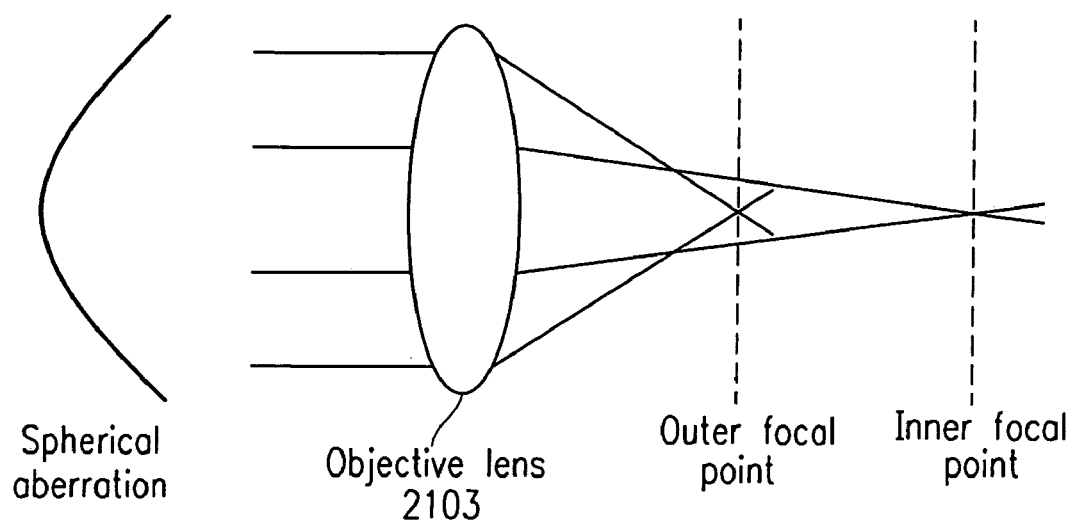
FIG. 31 illustrates outer and inner focal points of the optical beam when the controlling FE signal is zero at the first information surface.

Next, with reference to FIG. 31, the relationship between the spherical aberration and the focal point is described. FIG. 31 illustrates the outer and inner focal points of the optical beam when the controlling FE signal is zero at the first information surface.

As described above, in the first information surface, the thickness of the protective layer is smaller than the optimal value. The spherical aberration is as illustrated. The outer optical beam focuses on a position close to the objective lens 2103. The inner optical beam focuses on a position far from the objective lens 2103.

In the case where the controlling signal is zero at the second information surface, the thickness of the protective layer is larger than the optimal value. Thus, the outer optical beam focuses on a position far from the objective lens 2103. The inner optical beam focuses on a position close to the objective lens 2103.

Figure 32:
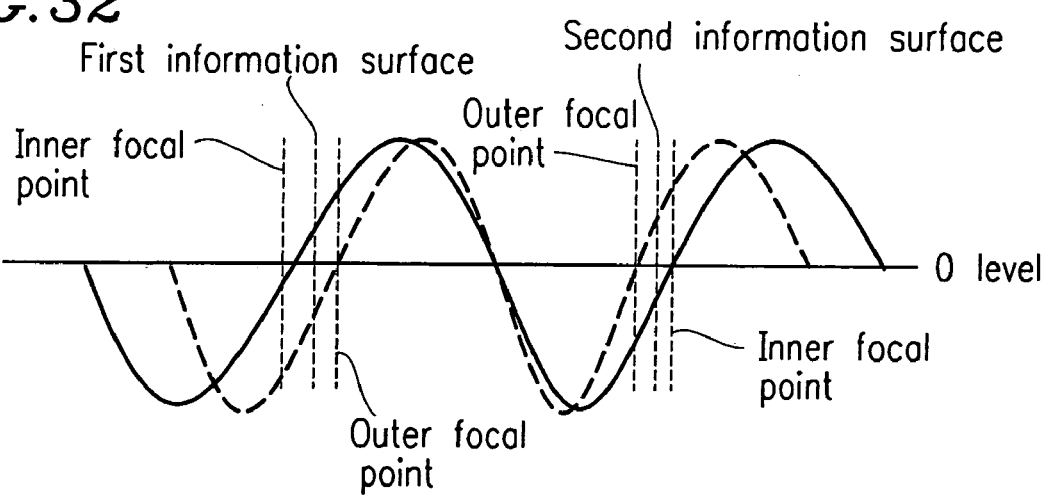
FIG. 32 shows waveforms of an outer FE signal and an inner FE signal.

Thus, when the objective lens 2103 approaches the information surfaces, the outer FE signal and the inner FE signal are in the waveforms as shown in FIG. 32. The solid line represents the inner FE signal and the broken line represents the outer FE signal. The controlling FE signal is an average of the outer FE signal and the inner FE signal.

As described above, when the focal point is shifted from the first information surface to the second information surface, the outer FE signal first crosses zero near the second information surface, and then the controlling FE signal crosses zero.

Next, an operation for shifting the focal point from the first information surface to the second information surface is described.

FIG. 33 shows waveforms of the signals used in the optical disc unit 2010. Waveform (a) represents the FE signal, waveform (b) represents waveform at the terminal d of the control 2117, and waveform (c) represents an output of the D/A converter of the microcomputer 2255. In waveform (a), the broken line represents the outer FE signal, a thick solid line represents the inner FE signal, and the fine solid line represents the controlling FE signal.

The microcomputer 2255 outputs the acceleration pulse for shifting the focal point to the second information surface from time $t_{70}$. Thus, the focal point shifts toward the second information surface. The microcomputer 2255 detects that the level of the outer FE signal is zero at time $t_{71}$ and stops the acceleration pulse. Then, the microcomputer 2255 outputs the deceleration pulse.

The microcomputer 2255 stops the deceleration pulse at time $t_{72}$, and connects the terminal c and the terminal a of the switch 2117 at time $t_{73}$ when the controlling FE signal crosses zero to perform the focus control again.

According to the optical disc unit of the present embodiment, it is possible to stop the deceleration pulse in an accurately timed manner compared to the case where the deceleration pulse is stopped based on the level of the controlling FE signal because the deceleration pulse can be stopped at the time when the outer FE signal crosses zero. As a result, it is possible to shift the focal point of the optical beam from one information surface to another information surface stably.

In the case where the optical system is not designed such that the spherical aberration is zero when the thickness of the protective layer is that between the thicknesses of the protective layers of the first and second information surfaces, timing may be determined by using the inner FE signal.

In such a case, in accordance with the information on the spherical aberration of depending on the thickness of the protective layer which is between the thicknesses of the protective layers of the first and second information surfaces, at least one of the outer FE signal and the inner FE signal maybe appropriately selected. Based on this signal, the actuator 2104 may be driven and the focal point of the optical beam may be shifted from one information surface to another information surface.

INDUSTRIAL APPLICABILITY

In an optical disc unit according the present invention, focus control to an information recording layer of an optical disc is performed after focus control to a surface of a protective layer of the optical disc is performed. Thus, the working distance is substantially extended by the thickness of the protective layer. As a result, it is possible to significantly reduce the possibility of an objective lens colliding into the optical disc surface even when an optical head having a large NA is used.

In another optical disc unit according to the present invention, only when amplification of a tracking error signal is detected to be a predetermined value or higher, the focus control is allowed to be started. Thus, without referring to the level of total internal reflection amount, it is possible to distinguish the optical disc surface and the information surface. As a result, even if the difference in levels of the total internal reflection amount of the optical disc surface and the total internal reflection amount of the information surface is small (for example, in the case of the doublelayer optical disc), the focusing to the information surface can be surely performed.

In another optical disc unit according to the present invention, in response to the detection of the focus error signal crossing zero for the second time, the focus control to the information surface is started. Thus, without referring to the level of the total internal reflection amount, it is possible to distinguish the optical disc surface and the information surface. As a result, even if a difference in the levels of the total internal reflection amount of the optical disc surface and the total internal reflection amount of the information surface is small (for example, in the case of the doublelayer optical disc), the focusing to the information surface can be surely performed.

In another optical disc unit according to the present invention, after wobbles of the optical disc surface have been learnt, focus control to the information surface is started. Thus, the focusing control to the information surface is performed to the optical disc surface of which wobbles has been learnt. As a result, it is possible to significantly reduce the possibility of the objective lens colliding into the optical disc due to wobbles of the optical disc.

In another optical disc unit according to the present invention, means for accurately calculating the total internal reflectance from the particular information surface (normalization means) is provided. Thus, the effects of the light reflected off information surfaces other than the particular information surface can be removed.

The invention claimed is:

1. An optical disc unit for an optical disc having at least one information recording layer and at least one protective layer formed on respective ones of the at least one information recording layer, comprising:
   reflective surface detection means for detecting a reflective surface;
   focus control means for performing focus control to the reflective surface such that a distance between a focal point of an optical beam applied to the optical disc and the reflective surface is within a predetermined error limit;
   shift means for shifting the position of the focal point in a direction perpendicular to the optical disc; and
   control means for controlling the focus control means and the shift means,
   wherein the control means controls the shift means such that the focal point of the optical beam shifts toward the protective layer until a surface of the protective layer is detected by the reflective surface detection means,
   the control means controls the focus control means to perform focus control to the surface of the protective layer when the surface of the protective layer is detected,
   the control means controls the shift means to release the focus control to the surface of the protective layer and shifts the focal point of the optical beam toward the information recording layer until a surface of the information recording layer is detected by the reflective surface detection means,
   the control means controls the focus control means to perform focus control to the surface of the information recording layer when the surface of the information recording layer is detected, and
   a feedback gain of the focus control to the surface of the information recording layer is changed from a feedback gain of the focus control to the surface of the protective layer based on a reflectance of the surface of the protective layer and a reflectance of the surface of the information recording layer.

2. An optical disc unit according to claim 1, wherein a feedback gain of the focus control to the surface of the protective layer and a feedback gain of the focus control to the surface of the information recording layer are set such that the product of the feedback gain of the focus control to the surface of the protective layer and a reflectance of the surface of the protective layer is equal to the product of the feedback gain of the focus control to the surface of the information recording layer and a reflectance of the surface of the information recording layer.

3. An optical disc unit according to claim 1, wherein:
information indicating the reflectance of the information recording layer is formed beforehand on the surface of the protective layer,
the control means reads the information from the surface of the protective layer while the focus control to the surface of the protective layer is performed, and sets the feed back gain of the focus control to the surface of the information recording layer based on the information.

4. An optical disc unit according to claim 1, wherein the reflectance of the surface of the protective layer is 3% to 5%.

5. An optical disc unit for an optical disc having at least one information surface having a plurality of tracks formed thereon, comprising:
tracking error detection means for detecting a misalignment between an optical beam applied to the optical disc and one of the plurality of tracks corresponding thereto, and outputting a tracking error signal indicating the misalignment;
amplification detection means for detecting amplification of the tracking error signal;
focus control means for performing focus control such that a distance between a focal point of the optical beam and the information surface is within a predetermined error limit;
shift means for shifting the position of the focal point of the optical beam toward the optical disc; and
control means for controlling the focus control means and the shift control means,
wherein the control means controls the shift means such that the focal point of the optical beam is shifted in a direction traversing tracks formed on the information surface of the optical disc and approaches the optical disc with an operation of the focus control means stopped; and
the control means allows the focus control means to start the operation only when the amplification of the tracking error signal is detected to become a predetermined value or higher by the amplification detection means.

6. An optical disc unit according to claim 5, wherein each of the plurality of the tracks formed on the information surface is wavy.

7. An optical disc unit according to claim 5, further comprising zero-cross detection means for detecting that a focus error signal indicating a misalignment between the focal point of the optical beam and the information surface crosses zero,
wherein the control means starts an operation of the focus control means when the amplification of the tracking error signal is detected to become the predetermined value or higher by the amplification detection means and the focus error signal is detected to cross zero by the zero-cross detection means.

8. An optical disc unit according to claim 5, further comprising a band-pass filter,
wherein the tracking error signal is supplied to the amplification detection means via the band-pass filter.

9. An optical disc unit according to claim 5, wherein the control means controls rotations of the optical disc such that the number of rotations of the optical disc when the amplification of the tracking error signal is detected by the amplification detection means is smaller than the number of rotations of the optical disc when information recorded on the information surface of the optical disc is being reproduced.

10. An optical disc unit according to claim 5, wherein the control means controls strength of the optical beam such that strength of the optical beam when the amplification of the tracking error signal is detected by the amplification detection means is smaller than strength of the optical beam when information recorded on the information surface of the optical disc is being reproduced.

11. An optical disc unit according to claim 5, wherein the control means performs the focus control with rotations of the optical disc stopped and controls the rotations of the optical disc such that the optical disc starts to rotate after the distance between the focal point of the optical beam and the information surface is detected to be within the predetermined error limit.

12. An optical disc unit for an optical disc having at least one information surface, comprising:
focus error detection means for outputting a focus error signal indicating a misalignment between a focal point of an optical beam applied to the optical disc and a predetermined surface;
shift means for shifting the position of the focal point of the optical beam in a direction perpendicular to the optical disc;
focus control means for performing focus control to the predetermined surface such that a distance between the focal point of the optical beam and the predetermined surface is within a predetermined error limit by controlling the shift means based on the focus error signal;
zero-cross detection means for detecting that the focus error signal crosses zero; and
control means for controlling the focus control means and the shift means, wherein
the control means controls the shift means such that the focal point of the optical beam shifts in a first direction toward a surface of the optical disc until the focus error signal is detected to cross zero for the first time by the zero-cross detection means,
the control means controls the shift means such that, when the focus error signal is detected to cross zero for the first time, the focal point of the optical beam further shifts in the first direction by a predetermined distance which is larger than a distance between the surface of the optical disc and the information surface,
the control means controls the shift means such that, until when the focus error signal is detected to cross zero by the zero-cross detection means after the focal point of the optical beam has been further shifted in the first direction by the predetermined distance, the focal point of the optical beam is shifted toward the information surface in a second direction opposite to the first direction, and
the control means controls the focus control means to perform the focusing control to the information surface when the focus error signal is detected to cross zero after the focal point of the optical beam has been further shifted in the first direction by the predetermined distance.

13. An optical disc unit according to claim 12, wherein the control means performs the focus control with rotations of the optical disc stopped and controls the rotations of the optical disc such that the optical disc starts to rotate after the distance between the focal point of the optical beam and the information surface is detected to be within the predetermined error limit.

14. An optical disc unit for an optical disc having at least one information surface, comprising:
focus error detection means for outputting a focus error signal indicating a misalignment between a focal point of an optical beam applied to the optical disc and a predetermined surface;
shift means for shifting the position of the focal point of the optical beam in a direction perpendicular to the optical disc;
focus control means for performing focus control to the predetermined surface such that the distance between the focal point of the optical beam and the predetermined surface is within a predetermined error limit by controlling the shift means based on the focus error signal;
zero-cross detection means for detecting that the focus error signal crosses zero; and
control means for controlling the focus control means and the shift means, wherein
the control means controls the shift means such that the focal point of the optical beam shifts toward a surface of the optical disc until the focus error signal is detected to cross zero for the first time by the zero-cross detection means,
the control means controls the focus control means to perform focus control to the surface of the optical disc when the focus error signal is detected to cross zero for the first time,
the control means stores displacement information indicating displacement of the shift means in accordance with a rotation angle of the optical disc in storage means while the focus control to the surface of the optical disc is performed,
the control means controls the shift means such that the focal point of the optical beam shifts toward the information surface based on the displacement information stored in the storage means with an operation of the focus control means stopped until the focus error signal is detected to cross zero for the second time by the zero-cross detection means, and
the control means controls the focus control means to perform the focus control to the information surface when the focus error signal is detected to cross zero for the second time.

15. An optical disc unit according to claim 14, wherein the focus control means controls phase compensation such that a band in which a phase leads is wider, compared to when information recorded on the optical disc is being reproduced, for a predetermined period after the focus control means has started the operation.

16. An optical disc unit according to claim 14, wherein the focus control means sets a gain such that the gain is smaller, compared to when information recorded on the optical disc is being reproduced, for a predetermined period after the focus control means has started the operation.

17. An optical disc unit for an optical disc having a plurality of information surfaces, comprising:
photodetection means for detecting light reflected off the optical disc when an optical beam is applied to a predetermined surface among the plurality of information surfaces;
focus error detection means for outputting a focus error signal indicating a misalignment between a focal point of the optical beam and the predetermined information surface based on an output from the photodetection means;
total internal reflection amount detection means for detecting an amount of total internal reflection off the optical disc based on the output from the photodetection means; and
normalization means for generating a normalized focus error signal by dividing the focus error signal by a value obtained by subtracting a signal value corresponding to a reflection amount reflected off information surfaces other than the predetermined information surface of the optical disc from the output of the total internal reflection amount detection means.

18. An optical disc unit according to claim 17, further comprising:
shift means for shifting the position of the focal point of the optical beam in a direction perpendicular to the optical disc;
focus control means for performing focus control such that a distance between the focal point of the optical beam and the predetermined information surface is within a predetermined error limit by controlling the shift means based on the normalized focus error signal; and
focus gain measurement means for measuring a gain of a system of the focus control,
wherein the signal value varies depending on an output from the focus gain measurement means.

19. An optical disc unit according to claim 17, further comprising shift means for shifting the position of the focal point of the optical beam in a direction perpendicular to the optical disc,
wherein the signal value varies such that amplification of the normalized focus error signal is a constant value when the shift means is driven such that the focal point of the optical beam passes through the predetermined information surface of the optical disc.

20. An optical disc unit according to claim 17, wherein the signal value varies depending on each of the plurality of the information surfaces.

21. An optical disc unit according to claim 20, further comprising stray light detection means for detecting light reflected off information surfaces other than the predetermined information surface of the optical disc on which the focal point of the optical beam is located,
wherein the signal value varies based on an output from the stray light detection means.

22. An optical disc unit according to claim 17, further comprising:
shift means for shifting the position of the focal point of the optical beam in a direction perpendicular to the optical disc; and
control means for controlling the shift means based on the normalized focus error signal so as to control the shift means to shift the focal point of the optical beam to information surfaces other than the predetermined information surface of the optical disc.

23. An optical disc unit, comprising:
optical beam splitting means for splitting light which is reflected off an optical disc having a plurality of information surfaces, after an optical beam is converged and applied to the optical disc, into light of an inner region near an optical axis and light of an outer region far from the optical axis;

inner focus error detection means for detecting a misalignment between a focal point of the optical beam and a predetermined information surface of the optical disc based on the light of the inner region; and outer focus error detection means for detecting the misalignment between the focal point of the optical beam and the predetermined information surface of the optical disc based on the light of the outer region, wherein the focal point of the optical beam is shifted to information surfaces other than the predetermined information surface of the optical disc based on at least one of outputs from the inner and outer focus error detection means.

* * * * *